(12) United States Patent
Yoshida et al.

(10) Patent No.: US 9,030,750 B2
(45) Date of Patent: May 12, 2015

(54) OBJECTIVE LENS

(75) Inventors: Miwako Yoshida, Yokohama (JP);
Akiko Miyakawa, Sagamihara (JP)

(73) Assignee: Nikon Corporation, Tokyo (JP)

( * ) Notice: Subject to any disclaimer, the term of this patent is extended or adjusted under 35 U.S.C. 154(b) by 259 days.

(21) Appl. No.: 12/861,468

(22) Filed: Aug. 23, 2010

(65) Prior Publication Data

US 2011/0090565 A1 Apr. 21, 2011

Related U.S. Application Data

(63) Continuation of application No. PCT/JP2009/053293, filed on Feb. 24, 2009.

(30) Foreign Application Priority Data

Feb. 25, 2008 (JP) .................................. 2008-042763

(51) Int. Cl.
*G02B 21/02* (2006.01)
*G02B 27/44* (2006.01)
*G02B 27/00* (2006.01)
*G02B 27/42* (2006.01)

(52) U.S. Cl.
CPC ............ *G02B 21/02* (2013.01); *G02B 27/0037* (2013.01); *G02B 27/4211* (2013.01)

(58) Field of Classification Search
USPC ......... 359/692, 795, 565, 566, 569, 686, 356, 359/656, 657, 661
See application file for complete search history.

(56) References Cited

U.S. PATENT DOCUMENTS 2,865,253 A * 12/1958 Thielens ........................ 359/356
3,658,411 A *  4/1972 Price ............................. 359/686
4,666,256 A *  5/1987 Shimizu et al. ............... 359/658
5,631,779 A    5/1997 Kashima
5,748,372 A *  5/1998 Kitagawa ...................... 359/565

(Continued)

FOREIGN PATENT DOCUMENTS

EP    1 455 200    8/2004
EP    1830204      9/2007

(Continued)

OTHER PUBLICATIONS

International Search Report for PCT/JP2009/053293, mailed Jun. 2, 2009.

(Continued)

*Primary Examiner* — Audrey Y Chang
(74) *Attorney, Agent, or Firm* — Staas & Halsey LLP

(57) ABSTRACT

An objective lens OL comprises: a first lens group G1 disposed on an object side, having positive refractive power as a whole and having a positive lens (plano-convex lens L1) which is disposed closest to the object and of which lens surface closest to the object is a plane or a surface having a low curvature, and at least one cemented lens (cemented lens CL12 or the like); a second lens group G2 disposed on an image side, having negative refractive power as a whole, and having a concave surface facing the image and a concave surface facing the object, which face each other; and a diffractive optical element GD in which two diffractive element constituents made from different optical materials are cemented, which has a diffractive optical surface D formed with diffraction grating grooves on the cemented surface, and which is disposed closer to the object than a position where a principal ray crosses the optical axis.

16 Claims, 15 Drawing Sheets

(56) References Cited

U.S. PATENT DOCUMENTS

| | | | |
|---|---|---|---|
| 6,628,462 B2 * | 9/2003 | Ogawa | 359/743 |
| 7,046,451 B2 * | 5/2006 | Mandai et al. | 359/661 |
| 2003/0161044 A1 * | 8/2003 | Tokoyoda | 359/569 |
| 2008/0094712 A1 | 4/2008 | Miyakawa | |
| 2008/0107903 A1 | 5/2008 | Miyakawa et al. | |

FOREIGN PATENT DOCUMENTS

| | | |
|---|---|---|
| JP | 6-331898 | 12/1994 |
| JP | 8-286113 | 11/1996 |
| WO | 2006/068137 A1 | 6/2006 |
| WO | 2006/068138 A1 | 6/2006 |

OTHER PUBLICATIONS

Chinese Patent Office Action mailed Nov. 9, 2011 for corresponding Chinese Patent No. 200980106293.9.

Japanese Patent Office Action mailed Apr. 20, 2012 for corresponding Japanese Patent Application No. 2008-042763.

Extended European Search Report dated Apr. 9, 2014 in European Patent Application No. 09713809.3.

Written Opinion of the International Searching Authority mailed Jun. 2, 2009 for corresponding International Patent Application No. PCT/JP2009/053293.

* cited by examiner

OBJECTIVE LENS

This is a continuation of PCT International Application No. PCT/JP2009/053293, filed on Feb. 24, 2009, which is hereby incorporated by reference. This application also claims the benefit of Japanese Patent Application No. 2008-042763, filed in Japan on Feb. 25, 2008, which is hereby incorporated by reference.

FIELD

Various embodiments of the present invention relate to an objective lens.

BACKGROUND

For an objective lens of a microscope, a high numerical aperture has always been demanded in order to improve resolution and brightness during fluorescent viewing, and good correction of chromatic aberration is also required. However as numerical aperture increases, the depth of focus decreases and correction of chromatic aberration (including chromatic aberration due to spherical aberration) becomes difficult, and in order to solve this problem, many anomalous dispersion glasses must be used, which are expensive and difficult to process. Also picture elements, such as CCD and peripheral technology thereof, are advancing lately, and the purpose of a microscope is becoming more like an image input device rather than a conventional microscope for viewing samples using an eye piece. In this case, an obtained image is preferably flat and uniform throughout the entire field of view. In this situation, today various objective lenses using diffractive optical elements are being proposed in order to correct chromatic aberration in an advanced way (e.g. see Patent Document 1).

Patent Document 1: Japanese Laid-Open Patent publication No. H06-331898

A problem of this objective lens, however, is that various aberrations throughout the entire field of view cannot be sufficiently corrected to be used for a microscope.

SUMMARY

Various embodiments of the present invention provide an objective lens in which many anomalous dispersion glasses are not used, numerical aperture is high, and various aberrations, particularly chromatic aberrations, are sufficiently corrected throughout the entire field of view.

An objective lens according to various embodiments of the present invention comprises, for example, in order from an object, a first lens group having positive refractive power as a whole, and a second lens group having negative refractive power as a whole. The first lens group includes: a positive lens group which is disposed closest to the object and of which lens surface facing the object is a plane or a concave surface; a diffractive optical element in which two diffractive element constituents made from optical materials are cemented, and which has a diffractive optical surface formed with diffraction grating grooves on the cemented surface; and at least one cemented lens, and the second lens group includes a concave surface facing an image and a concave surface facing the object, which face each other. The diffractive optical element is disposed closer to the object than a position where a principal ray crosses the optical axis. According to an embodiment, the objective lens satisfies the following conditional expression:

$|\theta max| \leq 10°$ where θmax denotes a maximum incident angle of a ray that enters the diffractive optical element, and satisfies the following conditional expression:

$|fdoe/fa| \geq 100$ where fa denotes a focal length of the objective lens, and fdoe denotes a focal length of the diffractive optical element.

In an embodiment of the objective lens, the following conditional expression is satisfied:

$3 \leq |f2/fa| \leq 30$ where fa denotes a focal length of the objective lens, and f2 denotes a focal length of the second lens group, the power Φ of a lens surface is defined by $\Phi = (n'-n)/r$ where r denotes a radius of curvature of the lens surface, and n and n' are refractive indexes at the d-line of media before and after the lens surface, and the following conditional expression is satisfied:

$0.7 \leq |\Phi 2\text{-}1/\Phi 2\text{-}2| \leq 1.4$ where Φ2-1 denotes a power of the concave surface facing the image, and Φ2-2 denotes a power of the concave surface facing the object in the second lens group.

In an embodiment of the objective lens, the following conditional expression is satisfied:

$2 \leq N/H \leq 10$ where N denotes a number of diffraction grating grooves on the diffractive optical surface in the diffractive optical element, and H denotes an effective radius of the diffractive optical surface in the diffractive optical element.

In an embodiment of the objective lens, the following conditional expression is satisfied:

$vd max \leq 85$ where ν dmax denotes a maximum value of Abbe numbers of positive lenses included in the objective lens.

In an embodiment of the objective lens, the following conditional expressions are satisfied:

$nd1 \leq 1.54$ $0.0145 \leq nF1 - nC1$ $1.55 \leq nd2$ $nF2 - nC2 \leq 0.013$ where nd1 denotes a refractive index at the d-line (λ=587.562 nm), nF1 denotes a refractive index at the F-line (λ=486.133 nm), and nC1 denotes a refractive index at the C-line (λ=656.273 nm) of a material of the diffractive element constituent of which refractive index is lower and Abbe number is smaller, out of the two diffractive element constituents of the diffractive optical element, and nd2 denotes a refractive index at the d-line, nF2 denotes a refractive index at the F-line, and nC2 denotes a refractive index at the C-line of a material of the diffractive element constituents of which refractive index is higher and Abbe number is greater, out of the two diffractive element constituents of the diffractive optical element.

In an embodiment of the objective lens, the first lens group has at least one positive single lens.

With an objective lens according to various embodiments of the present invention, an objective lens can be provided in which numerical aperture is high, and various aberrations, particularly chromatic aberrations, can be sufficiently corrected throughout the entire field of view.

The above description relates to various features in various embodiments of an objective lens. However, all embodiments are not intended to being limited to including all these features. Accordingly, it is to be understood that both the foregoing general description and the following detailed description are exemplary and explanatory and are not restrictive of the invention, as claimed.

EXPLANATION OF NUMERALS AND CHARACTERS

OL (OL1 to 7) objective lens
G1 first lens group
L1 plan-convex lens (positive lens)
L3 positive meniscus lens (positive single lens)
CL12, CL13, CL14, CL15 cemented lens
G2 second lens group
GD diffractive optic element
D diffractive optical surface

DESCRIPTION OF THE EMBODIMENTS

Embodiments of the present invention will now be described with reference to the drawings. First a configuration of an Objective lens according to an embodiment of the present invention will be described using FIG. 1. The objective lens OL has, in order from an object, a first lens group G1 which has positive refractive power as a whole, and a second lens group G2 which is disposed at the image side and has negative refractive power as a whole, and a diffractive optical element GD is disposed closer to the object than a position where the principal ray crosses the optical axis.

Figure 1:
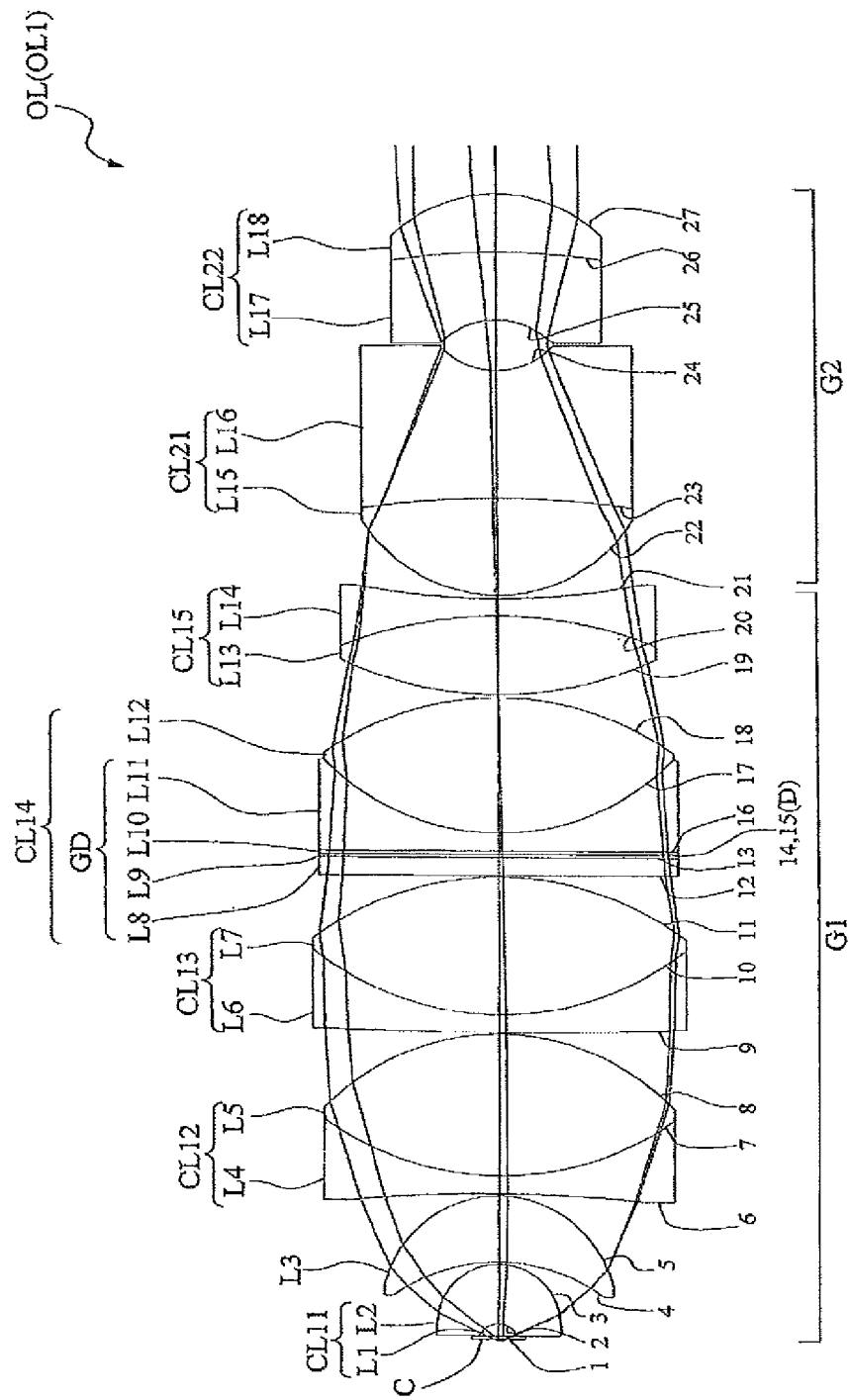
FIG. 1 is a diagram depicting the lens configuration of an objective lens according to Example 1 of an embodiment of the present invention.

In this objective lens OL, the first lens group G1 is a lens group for converging divergent lights emitted from the object, and has a positive lens component having a sharp convex surface facing the image (e.g. cemented lens CL11 in which a plano-convex lens L1 and positive meniscus lens L2 are cemented, in the case of FIG. 1), which is disposed closest to the object. Here a positive lens is disposed in the object side of the positive lens component disposed closest to the object, and this object side surface of the positive lens is formed to be a plane or a concave surface having a low curvature, so that bubbles do not remain on the object side surface ($1^{st}$ surface) of the positive lens, and various aberrations are not generated upon viewing the object (sample) with the tip of the objective lens OL being dipped in immersion liquid. In various embodiments, at least one single lens (e.g. positive meniscus lens L3 in the case of FIG. 1) is disposed in the first lens group G1, because spherical aberration and coma aberration are generated if the curvature of the image side convex surface of the positive lens component disposed closest to the object is high. Here the positive lens component is constituted by a single lens or a cemented lens.

In the objective lens OL of the present embodiment, the diffractive optical element GD is disposed for correcting chromatic aberration. The diffractive optical element GD has a diffractive optical surface D in which grating structures formed of several lines to several hundred lines of fine grooves or slits per 1 mm are formed concentrically, and has properties such that the light which entered into this diffractive optical surface D is diffracted to a direction determined by the grating pitch (space of diffraction grating grooves) and the wavelength of the incident light. The diffractive optical element GD (diffractive optical surface D) has a negative dispersion value (Abbe number=−3.453, in the case of the present embodiment), that is, dispersion is major and anomalous dispersion (partial dispersion ratio (ng−nF)/(nF−nC)= 0.2956 in the case of the present embodiment) is strong, therefore the diffractive optical element GD has strong chromatic aberration correction capability. The Abbe number of the optical glass is normally about 30 to 80, but the Abbe number of the diffractive optical element has a negative value. In other words, unlike normal glass (refractive optical element), the diffractive optical surface D of the diffractive optical element GD has a dispersion characteristic in which the refractive index decreases as the wavelength of the light is shorter, and the light is refracted more as the wavelength of the light is longer. Hence a good achromatic effect can be implemented if this diffractive optical element GD is combined with a normal refractive optical element. As a result, chromatic aberration can be corrected well by using the diffractive optical element GD.

In order to simultaneously correct the longitudinal chromatic aberration and lateral chromatic aberration by the diffractive optical element GD, the diffractive optical surface D must be disposed closer to the object than the position where the principal ray crosses the optical axis, due to the arrangement of refractive power. This is because the longitudinal chromatic aberration and lateral chromatic aberration can be corrected in a balanced way by the diffractive optical element GD in the front side (object side) of the position where the principal ray crosses the optical axis, and the remaining lateral chromatic aberration can be corrected behind the position where the principal ray crosses the optical axis, using a cemented lens or the like. To prevent a decrease in the minimum pitch of the diffraction grating grooves of the diffractive optical element GD, primary achromatism must be performed to a certain extent using a refractive lens of the first lens group G1. For this purpose, at least one cemented lens (e.g. cemented lens CL12 in the case of FIG. 1) is disposed in the first lens group G1.

The diffractive optical element GD according to the present embodiment, in which the diffractive optical surface D is constructed by cementing two diffractive element constituents made from different optical materials (e.g. optical members L9 and L10 in the case of FIG. 1) and forming diffraction grating grooves on the cemented surface, is called a "contact multi-layer type diffractive optical element". Therefore this diffractive optical element can increase the diffraction frequency in a wide wavelength range from the g-line ($\lambda$=435.835 nm) to the C-line. As a result, the objective lens OL, according to the present embodiment, can be applied to a wide wavelength range. The diffraction frequency shows a ratio $\eta$ (=I1/I0×100 [%]) of the incident intensity I0 and the intensity I1 of the primary diffracted light when the primary diffractive light is used in a transmission type diffractive optical element is used.

Compared with a separated multi-layer type diffracted optical element, in which two diffractive element constituents having the diffraction grating grooves are closely disposed so that the diffraction grating grooves face each other, the contact multi-layer type diffractive optical element can be manufactured by simple manufacturing steps. Therefore mass production efficiency is high and diffraction efficiency with respect to the incident angle of view is good. Hence in the case of the objective lens OL according to the present embodiment, which uses the contact multi-layer type diffractive optical element, manufacturing is easy and diffraction efficiency improves.

The second lens group G2 is a lens group for making the bundle of lights which are converged by the first lens group G1 to be parallel beams. The second lens group G2 has a so called "Gaussian type configuration" in order to correct the Petzval sum, and has a negative lens having a concave surface with high curvature (bi-concave lens L16 in FIG. 1) facing the image, and a negative lens having a concave surface with high curvature facing the object (negative meniscus lens L17 in FIG. 1), such that these concave surfaces (concave surface facing the image (24th surface) of the lens L16 and the concave surface facing the object (25th surface) of the lens L17 in FIG. 1) face each other. A diameter of the light bundle is the smallest at one of the concave surfaces of the lenses CL21 and CL22 in the second lens group G2, as shown in FIG. 1.

The conditions for constructing the objective lens OL according to the present embodiment will now be described. If an angle of the luminous flux entering the diffractive optical element GD is large, diffraction efficiency drops and efficiency of diffracted lights of orders other than the designed order increases and flares are generated. Therefore in this objective lens OL, the diffractive optical element GD must be disposed in a position that satisfies the following conditional expression (1).

$$|\theta max| \leq 10° \tag{1}$$

where $\theta$max denotes a maximum incident angle of a ray that enters the diffractive optical element GD.

The conditional expression (1) specifies a maximum incident angle of a ray that enters the diffractive optical element GD. By satisfying this conditional expression (1), diffraction efficiency improves, an increase of efficiency of diffracted lights of orders other than the design order is suppressed, and flares can be well prevented.

The objective lens OL, according to the present embodiment, satisfies the following conditional expression (2), where fa denotes a focal length of the entire objective lens OL, and fdoe denotes a focal length of the diffractive optical element GD.

$$|fdoe/fa| \geq 100 \tag{2}$$

The conditional expression (2) is a conditional expression for limiting the power of the diffractive optical surface D of the diffractive optical element GD. If the lower limit of the conditional expression (2) is not reached, the power of the diffractive optical surface D of the diffractive optical element GD becomes too high, and a major chromatic aberration is generated. If this chromatic aberration generated on the diffractive optical surface D is corrected in other refractive systems, the power of the refractive system increases, and spherical aberration and coma Aberration are generated, which cannot be corrected. The pitch width of the peripheral diffraction grating grooves also decreases, and manufacturing becomes difficult.

In various embodiments, the objective lens OL satisfies the following conditional expression (3), where f2 denotes a focal length of the second lens group G2.

$$3 \leq |f2/fa| \leq 30 \tag{3}$$

The conditional expression (3) is a conditional expression for limiting the power of the second lens group G2. If the upper limit of the conditional expression (3) is exceeded, the Petzval sum increases and flatness of the image is affected. If the lower limit of the conditional expression (3) is not reached, on the other hand, spherical aberration and coma aberration of a high order are generated. To further improve performance, in various embodiments the lower limit of the conditional expression (3) is 4, and the upper limit thereof is 20.

In various embodiments this objective lens OL satisfies the following conditional expression (4), where $\Phi$2-1 denotes a power of the concave surface having high curvature facing the image of the second lens group G2, and $\Phi$2-2 denotes a power of the concave surface having high curvature facing the object thereof. Here the power $\Phi$ of the lens surface is defined as follows, where r denotes a radius of curvature, and n and n' denote refractive indexes at the d-line of media before and after this lens surface.

$$0.7 \leq |\Phi 2\text{-}1/\Phi 2\text{-}2| \leq 1.4 \tag{4}$$

Where $\Phi = (n'-n)/r$.

The conditional expression (4) is a conditional expression for limiting the balance of power of the concave surfaces facing each other disposed in the second lens group G2, if the upper limit or lower limit of the conditional expression (4) is not satisfied, the balance of powers of the concave surfaces having high curvature facing each other worsens, and coma aberration becomes aggrivated.

In various embodiments, the objective lens OL according to this example satisfies the following conditional expression (5), where N denotes a number of diffraction grating grooves of the diffractive optical surface D of the diffractive optical element GD, and H denotes an effective radius of the diffractive optical surface D.

$$2 \leq N/H \leq 10 \tag{5}$$

The conditional expression (5) is a conditional expression for specifying appropriate ranges of a number of diffraction grating grooves and effective radius of the diffractive optical surface D. If the upper limit of the conditional expression (5) is exceeded, correction of chromatic aberration becomes excessive. If the lower limit of the conditional expression (5) is not reached, on the other hand, correction becomes insufficient.

The objective lens OL, according to the present embodiment, satisfies the following conditional expression (6), where ν dmax denotes a maximum value of the Abbe numbers of the positive lenses included in the objective lens OL.

$$\nu d\text{max} \leq 85 \tag{6}$$

The conditional expression (6) is a conditional expression for specifying an Abbe number of a positive lens included in the objective lens OL. The glass material having an Abbe number that exceeds the upper limit of the conditional expression (6) is a material having anomalous dispersion characteristics, such as fluorite, and if such a material is used for the positive lens in addition to using the diffractive optical element GD, then correction of chromatic aberration becomes excessive.

The objective lens OL, according to the present embodiment, satisfies the following conditional expressions (7) to (10), where nd1 denotes a refractive index at the d-line, nF1 denotes a refractive index at the F-line, and nC1 denotes a refractive index at the C-line, of the material of the diffractive element constituent of which refractive index is lower and Abbe number is smaller, out of the two diffractive element constituents of the diffractive optical element GD, and nd2 denotes a refractive index at the d-line, nF2 denotes a refractive index at the F-line and nC2 denotes a refractive index at the C-line of the material of the diffractive element constituent of which refractive index is higher and Abbe number is greater, out of the two diffractive element constituents of the diffractive optical element.

$$nd1 \leq 1.54 \tag{7}$$

$$0.0145 \leq nF1 - nC1 \tag{8}$$

$$1.55 \leq nd2 \tag{9}$$

$$nF2 - nC2 \leq 0.013 \tag{10}$$

The conditional expressions (7) to (10) specify the refractive indexes and dispersion with respect to the F-line and C-line (nF−nC) of the two diffractive element constituents of the diffractive optical element GD respectively. By satisfying these conditional expressions, two different diffractive element constituents can be cemented to form the diffractive optical surface D with better performance, and as a result, 90% or higher diffraction efficiency can be implemented in a wide wavelength range from the g-line to C-line. An example of resins used for such optical materials is disclosed in Japanese Patent Application No. 2004-367607 and Japanese Patent Application No. 2005-237573. If the upper limit or lower limit of each conditional expression (7) to (10) is not satisfied, the diffractive optical element GD of the achromatic lens system according to the present embodiment becomes difficult to implement a 90% or higher diffraction efficiency and to maintain the form of the contact multi-layer type diffractive optical element.

When ηm is a diffraction efficiency of the diffracted light of the m-th order, the diffraction efficiency ηm can be determined by the following expression. Here m denotes an order of diffraction, d denotes the height of the diffraction grating, n1 denotes a refractive index of one material constituting the diffraction grating surface (diffractive optical surface D), n2 denotes the refractive index of the other material constituting the diffraction grating surface (diffractive optical surface D), and λ denotes wavelength.

$$\eta m = \{(\sin(a-m)\pi)/(a-m)\pi\}^2$$

where $$a = \{(n1-1)d - (n2-1)d\}/\lambda.$$

In the case of a combination of resins used for the following examples, a contact multi-layer type diffractive optical element having superb values can be implemented, that is, the grating height is 20.05 μm, and the first order diffraction efficiency is 98% or higher in a wide wavelength range, 98% at the g-line, 98% at the F-line, 100% at the d-line and 98% at the C-line.

EXAMPLES

Seven examples of the objective lens OL according to the present embodiment will be shown below, and in each example, the phase difference of the diffractive optical surface D formed on the diffractive optical element GD is calculated by the ultra high refractive index method, which uses a normal refractive index and a later mentioned aspherical expression (11). The ultra high refractive index method uses a predetermined equivalence relationship between the aspherical form and the grating pitch on the diffractive optical surface, and in the present examples, the diffractive optical surface D is shown by the data of the ultra high refractive index method, that is, by the later mentioned aspherical expression (11) and the coefficients thereof. In the examples, d-line, C-line, F-line and g-line are selected as the target of calculating aberration characteristics. Table 1 shows the wavelengths of the d-line, C-line, F-line and g-line used for the present examples, and the refractive index values set for each spectral line used for the calculation of the ultra high refractive index method.

TABLE 1

| | Wavelength | Refractive index (based on ultra high refractive index method) |
|---|---|---|
| d-line | 587.562 nm | 10001.0000 |
| C-line | 656.273 nm | 11170.4255 |
| F-line | 486.133 nm | 8274.7311 |
| g-line | 435.835 nm | 7418.6853 |

In each example, an aspherical surface is given by the following expression (11), where y is a height in a direction perpendicular to the optical axis, S(y) is a distance (sag) from a tangential plane of a vertex of each aspherical surface at height y to each aspherical surface along the optical axis, r is a radius of curvature of the reference spherical surface (paraxial radius of curvature), κ is a conical coefficient, and An is an aspherical coefficient of the n-th order. In the following examples, "E-n" means "$\times 10^{-n}$". The paraxial radius of curvature R at this time is given by the following expression (12).

$$S(y) = (y^2/r)/\{1+(1-\kappa \times y^2/r^2)^{1/2}\} + A2 \times y^2 + A4 \times y^4 + A6 \times y^6 + A8 \times y^8 \tag{11}$$

$$R = 1/(1/r + 2A2) \tag{12}$$

In each example, "*" is attached to the right side of the surface number if the diffractive optical surface is formed on the lens surface, and the aspherical expression (11) indicates the data of the performance of the diffractive optical surface.

Figure 15:
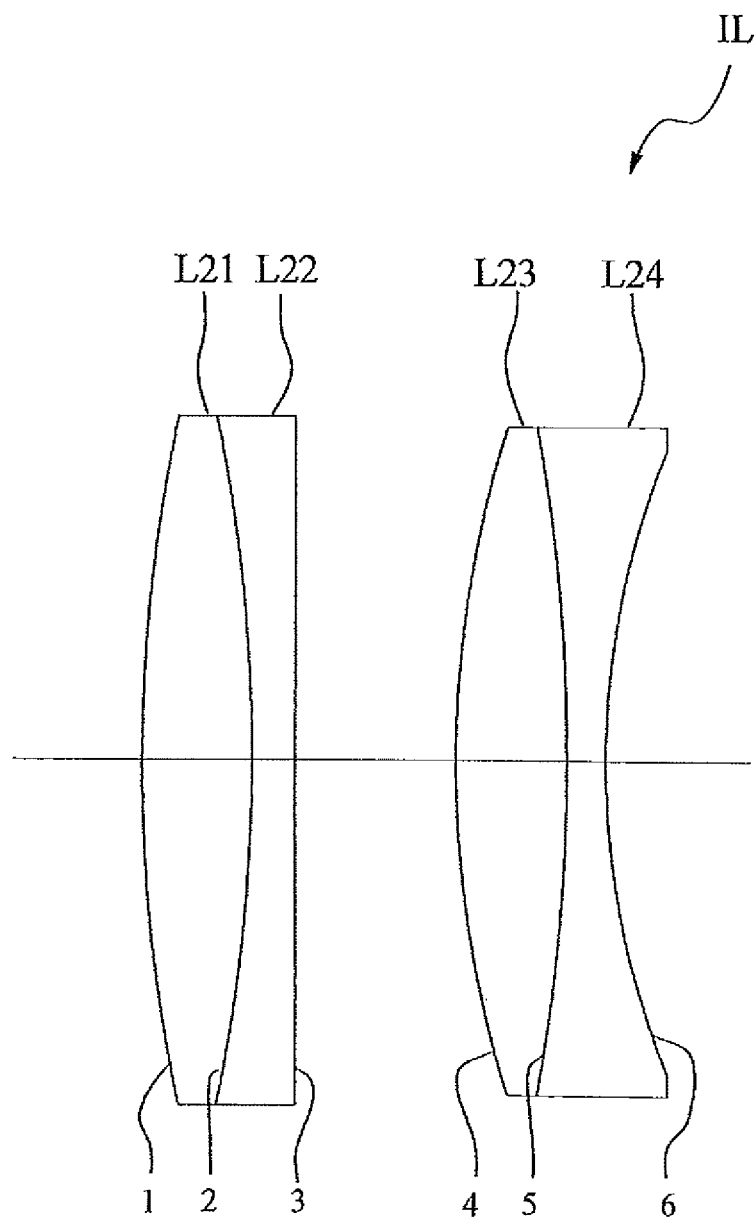
FIG. 15 is a diagram depicting a lens configuration of an imaging lens that is used with the objective lens.

The objective lens OL of each example is an infinity correction type having a configuration shown in FIG. 15, and is used together with the imaging lens IL having the data shown in Table 2. In Table 2, the first column m shows a number of each optical surface, counted from the object side, the second column r shows a radius of curvature of each optical surface, the third column d shows a distance on the optical axis from each optical surface to the next optical surface, the fourth column nd shows a refractive index at the d-line, and the fifth column vd shows the Abbe number. The refractive index of air, 1.00000, is omitted here. This description on the data table is the same for the other examples herein below.

TABLE 2

| m | r | d | nd | vd |
|---|---|---|---|---|
| 1 | 75.043 | 5.1 | 1.62280 | 57.0 |
| 2 | −75.043 | 2.0 | 1.74950 | 35.2 |
| 3 | 1600.580 | 7.5 | | |
| 4 | 50.256 | 5.1 | 1.66755 | 42.0 |
| 5 | −84.541 | 1.8 | 1.61266 | 44.4 |
| 6 | 36.911 | | | |

This imaging lens IL has, in order from the object, a cemented lens in which a bi-convex lens L21 and a bi-concave lens L22 are cemented, and a cemented lens in which a bi-convex lens L23 and a bi-concave lens L24 are cemented.

Example 1

FIG. 1, used for the above description, shows an objective lens OL1 according to Example 1. This objective lens OL1 is an objective lens used for a microscope in which a sample (object) is set under a cover plate C, and this sample is viewed in a state of the tip being dipped into immersion liquid, and comprises, in order from the object, that is in order from the cover plate C, a first lens group G1 having positive refractive power, and a second lens group G2 having negative refractive power, and a diffractive optical element GD is disposed in the first lens group G1. The first lens group G1 includes: a cemented lens CL11 in which a plano-convex lens L1 having a plane facing the object and a positive meniscus lens L2 having a sharp convex surface facing the image are cemented; a positive meniscus lens L3 having a concave surface facing the object; a cemented lens CL12 in which a bi-concave lens L4 and a bi-convex lens L5 are cemented; a cemented lens CL13 in which a negative meniscus lens L6 having a convex surface facing the object and a bi-convex lens L7 are cemented; a cemented lens CL14 which includes a diffractive optical plane D and cements a plano-concave lens L11 (diffractive optical element GD) having a concave surface facing the image, and a bi-convex lens L12; and a cemented lens CL15 in which a bi-convex lens L13 and a bi-concave lens L14 are cemented. The second lens group G2 includes: a cemented lens CL21 in which a bi-convex lens L15 and a bi-concave lens L16 having a concave surface with high curvature facing the image are cemented; and a cemented lens CL22 in which a negative meniscus lens L17 having a concave surface with high curvature facing the object, and a positive meniscus lens L18 having a convex surface facing the image are cemented.

As mentioned above, in the diffractive optical element GD, an optical glass L8, two optical members L9 and L10 constituted by different resin materials, and optical glass (plano-concave lens) L11 are cemented in this order, and diffraction grating grooves (diffractive optical surface D) are formed on the cemented surface of the optical members L9 and L10. In other words, this diffractive optical element GD is a contact multi-layer type diffractive optical element.

Table 3 shows the data of the objective lens OL1 according to Example 1 in FIG. 1. In Table 3, fa denotes a focal length of the entire objective lens OL1, NA denotes a numerical aperture, and β denotes a magnification. In Example 1 to Example 5, which use the cover plate C, d0 denotes a distance from the sample to the vertex of the lens surface closest to the object of the first lens closest to the object (lens L1) on the optical axis, excluding the thickness of the cover plate C, and in Example 6 and Example 7 which do not use the cover place C, d0 denotes a distance from the sample to the vertex of the lens surface closest to the object of the first lens closest to the object (lens L1). A number of each optical surface ("*" at the right indicates a lens surface formed as a diffractive optical surface) shown in the first column m corresponds to the surface numbers 1 to 27 shown in FIG. 1. In the second column r, the radius of curvature 0.0000 indicates a plane. In the case of a diffractive optical surface, the second column r shows a radius of curvature of a spherical surface which is a reference of the aspherical surface to be a base, and the data used for the ultra high refractive index method is shown in the data table as aspherical data. In Table 3, values corresponding to the conditional expressions (1) to (10), that is, condition correspondence values, are also shown. The cover plate C used for Example 1 to Example 5 has thickness 0.17 mm and a refractive index at the d-line of 1.522, and the refractive index nd and Abbe number vd at the d-line of the Immersion liquid are shown in the data table. This description is the same for the subsequent examples to be described later.

In the following data, "mm" is normally used for the unit of radius of curvature r, surface distance d, focal length of the the objective lens fa, and other lengths unless otherwise specified. However, the unit is not limited to "mm", but another appropriate unit can be used instead, since an equivalent optical performance is obtained even if an optical system is proportionally expanded or proportionally reduced.

TABLE 3 fa = 3.33
NA = 1.4
d0 = 0.14
β = 60X

| m | r | d | nd | vd |
|---|---|---|---|---|
| 1 | 0.000 | 0.65 | 1.518 | 59.0 |
| 2 | −1.261 | 3.37 | 2.003 | 28.3 |
| 3 | −3.538 | 0.12 | | |
| 4 | −10.382 | 3.71 | 1.652 | 58.5 |
| 5 | −6.752 | 0.12 | | |
| 6 | −90.644 | 1.01 | 1.517 | 52.4 |
| 7 | 17.410 | 8.00 | 1.498 | 82.5 |
| 8 | −13.988 | 0.10 | | |
| 9 | 269.060 | 1.00 | 1.720 | 34.7 |
| 10 | 17.427 | 7.80 | 1.498 | 82.5 |
| 11 | −17.877 | 0.10 | | |
| 12 | 0.000 | 1.00 | 1.517 | 64.1 |
| 13 | 0.000 | 0.20 | 1.557 | 50.2 |
| 14 | 0.000 | 0.00 | 10001.000 | −3.5 |
| 15* | 0.000 | 0.20 | 1.528 | 34.7 |
| 16 | 0.000 | 1.00 | 1.816 | 46.6 |
| 17 | 14.028 | 7.71 | 1.498 | 82.5 |
| 18 | −17.313 | 0.20 | | |
| 19 | 20.928 | 4.51 | 1.498 | 82.5 |
| 20 | −24.737 | 1.00 | 1.816 | 46.6 |
| 21 | 44.159 | 0.20 | | |
| 22 | 9.179 | 5.50 | 1.620 | 60.3 |
| 23 | −53.913 | 7.20 | 1.816 | 46.6 |
| 24 | 4.373 | 2.83 | | |
| 25 | −4.601 | 3.90 | 1.670 | 57.3 |

TABLE 3-continued

| 26 | −38.524 | 3.30 | 1.717 | 29.5 |
|---|---|---|---|---|
| 27 | −8.677 | | | |

Immersion liquid nd = 1.515
νd = 41.4

Diffractive optical surface data
Fifteenth surface

κ = 1    A2 = −1.92301E−08    A4 = 1.01800E−10
A6 = −3.71803E−13    A8 = −4.33291E−15

Condition correspondence value (1) |θmax| = 5.6°
(2) |fdoe/fa| = 780.8
(3) |f2/fa| = 10.7
(4) |Φ2−1/Φ2−2| = 1.28
(5) N/H = 2.77
(6) νdmax = 82.5
(7) nd1 = 1.528
(8) nF1 − nC1 = 0.0152
(9) nd2 = 1.557
(10) nF2 − nC2 = 0.011

Figure 2:
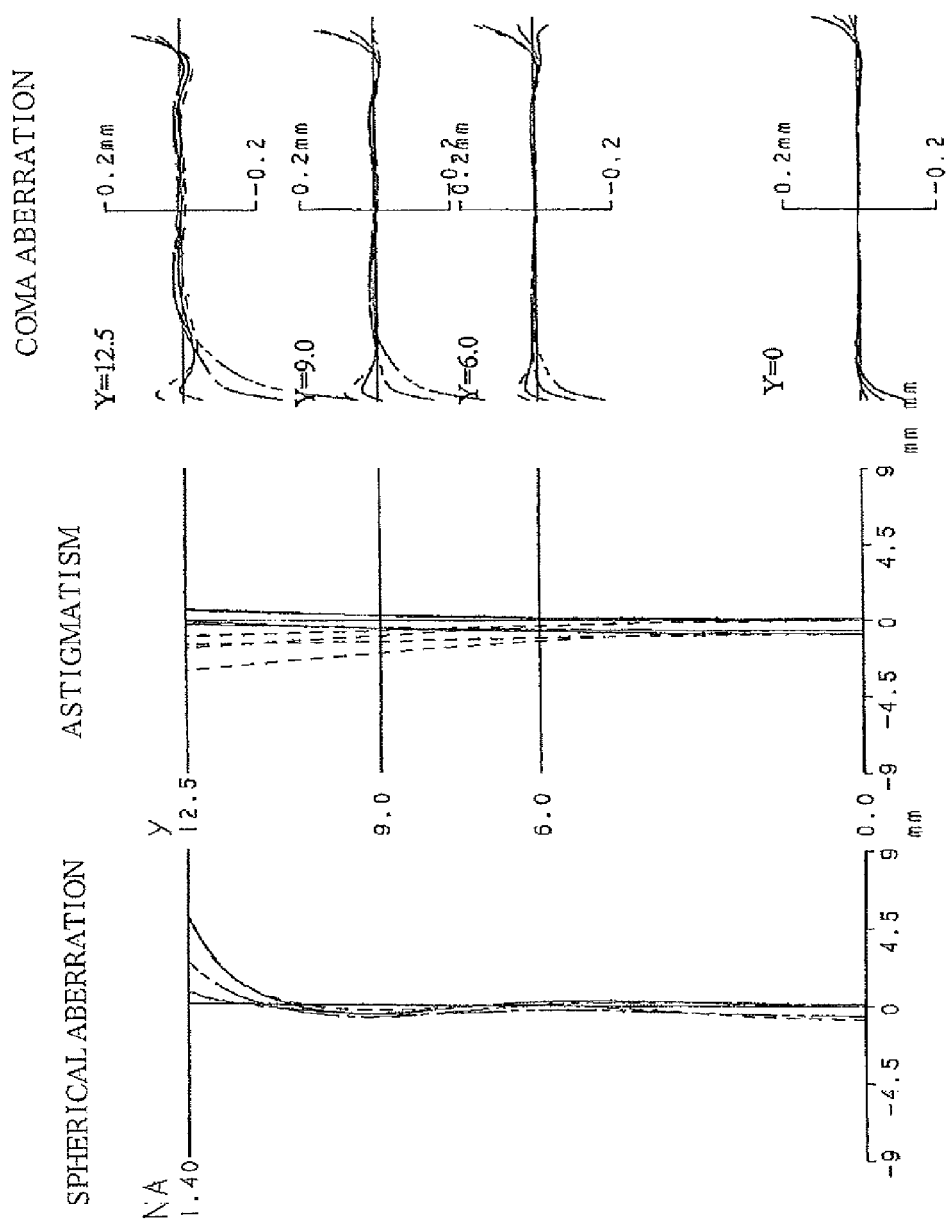
FIG. 2 are graphs showing various aberrations of the objective lens according to Example 1.

Among the conditional correspondence values shown in Table 3, Φ2-1, in conditional expression (4), indicates the power of the 24$^{th}$ surface, and Φ2-2 indicates power of the 25$^{th}$ surface. Thus in Example 1, all of the conditional expressions (1) to (10) are satisfied. FIG. 2 are graphs showing various aberrations of spherical aberration, astigmatism and coma aberration with respect to the d-line, C-line, F-line and g-line in Example 1. In these graphs, the graph showing spherical aberration indicates an aberration amount with respect to the numerical aperture NA, the graph showing astigmatism indicates an aberration amount with respect to the image height Y, and the graph showing coma aberration indicates aberrations amounts when the image height Y is 12.5 mm, 9 mm, 6 mm and 0 mm. In the graphs showing spherical aberration and coma aberration, the solid line indicates the d-line, the dotted line indicates the C-line, the dashed line indicates the F-line, and the two-dot chain line indicates the g-line. In the graph showing astigmatism, the solid line indicates the meridional image plane at each wavelength, and the broken line indicate the sagittal image plane at each wavelength. Description on the graphs showing various aberrations is the same for the subsequent examples. AS each graph showing aberrations in FIG. 2 clarifies, various aberrations are corrected well, and an excellent image forming performance is assured in Example 1.

Example 2

Now an objective lens OL2 shown in FIG. 3 will be described as Example 2. The objective lens OL2 shown in FIG. 3 as well is an objective lens used for a microscope in which a sample (object) is set under a cover plate C, and this sample is viewed in a state of the tip being dipped into immersion liquid, and comprises, in order from the object, that is, in order from the cover plate C, a first lens group G1 having positive refractive power, and a second lens group G2 having negative refractive power, and a diffractive optical element GD is disposed in the first lens group G1. The first lens group G1 includes: a plan-convex lens L1 having a plane facing the object and a sharp convex surface facing the image; a positive meniscus lens L2 having a concave surface facing the object; a positive meniscus lens L3 having a concave surface facing the object; a diffractive optical element GD; a cemented lens CL11 in which a bi-convex lens L8, a bi-concave lens L9 and a bi-convex lens L10 are cemented, and a cemented lens CL12 in which a negative meniscus lens L11 having a convex surface facing the object, a bi-convex lens L12 and a bi-concave lens L13 are cemented. The second lens group G2 includes: a cemented lens CL21 in which a bi-convex lens L14 and a bi-concave lens L15 having a concave surface with high curvature facing the image are cemented; and a cemented lens CL22 in which a bi-concave lens L16 having a concave surface with high curvature facing the object and a bi-convex lens L17 are cemented.

In the diffractive optical element GD, an optical glass L4, two optical members L5 and L6 constituted by different resin materials, and optical glass L7 are cemented in this order, and diffraction grating grooves (diffractive optical surface D) are formed on the cemented surface of the optical members L5 and L6.

Figure 3:
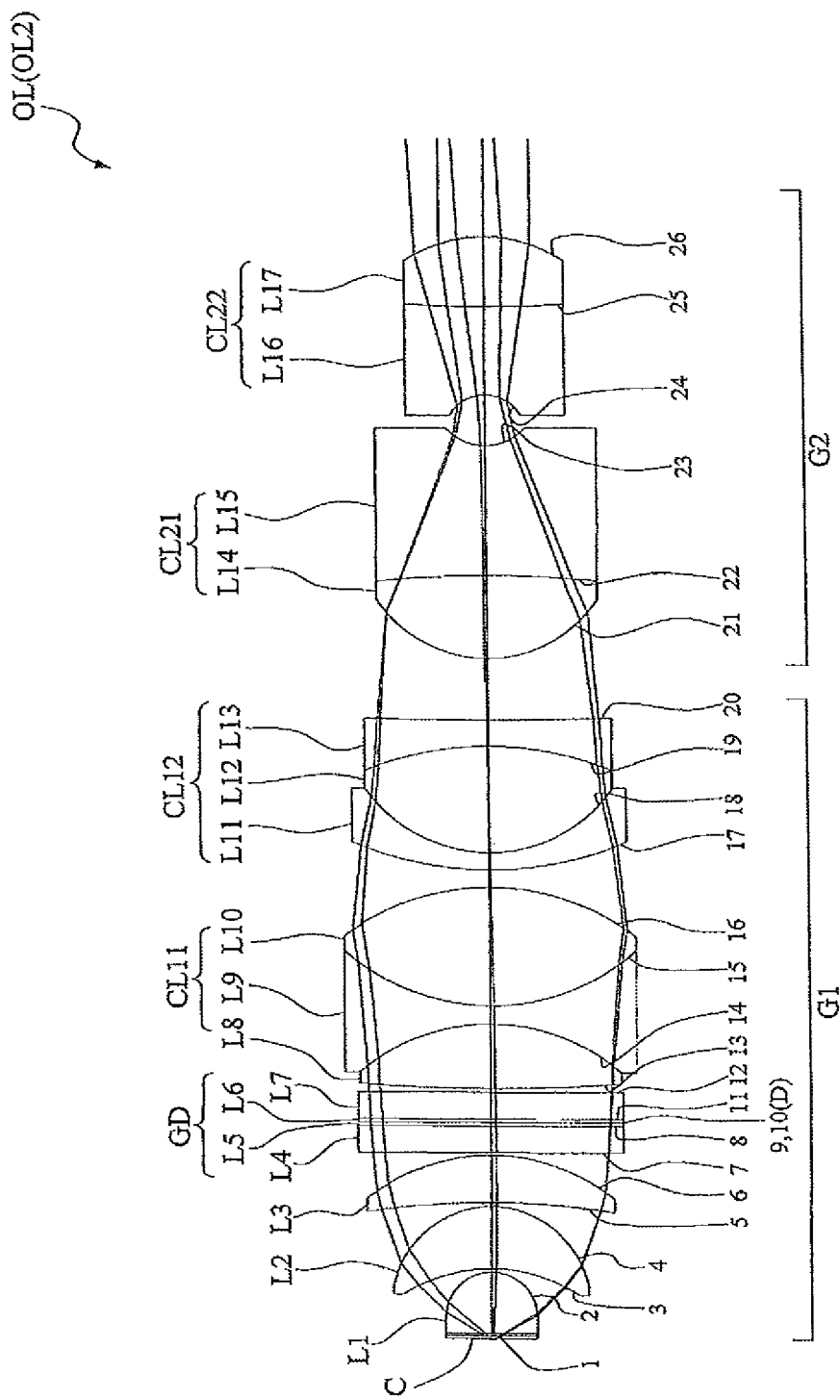
FIG. 3 is a diagram depicting the lens configuration of an objective lens according to Example 2 of an embodiment of the present invention.

Table 4 shows the data of the objective lens OL2 according to Example 2 in FIG. 3. The surface numbers in Table 4 correspond to the surface numbers 1 to 26 shown in FIG. 3.

TABLE 4 fa = 2.0
NA = 1.3
d0 = 0.22
β = 100X

| m | r | d | nd | νd |
|---|---|---|---|---|
| 1 | 0.000 | 3.41 | 1.518 | 59.0 |
| 2 | −2.630 | 0.19 | | |
| 3 | −9.283 | 3.46 | 1.603 | 65.4 |
| 4 | −5.640 | 0.22 | | |
| 5 | −45.586 | 2.62 | 1.498 | 82.5 |
| 6 | −11.264 | 0.15 | | |
| 7 | 0.000 | 1.50 | 1.518 | 59.0 |
| 8 | 0.000 | 0.20 | 1.557 | 50.2 |
| 9 | 0.000 | 0.00 | 10001.000 | −3.5 |
| 10* | 0.000 | 0.20 | 1.528 | 34.7 |
| 11 | 0.000 | 1.50 | 1.518 | 59.0 |
| 12 | 0.000 | 0.20 | | |
| 13 | 95.573 | 3.62 | 1.498 | 82.5 |
| 14 | −11.434 | 1.03 | 1.613 | 44.3 |
| 15 | 12.550 | 6.72 | 1.498 | 82.5 |
| 16 | −13.511 | 1.00 | | |
| 17 | 19.710 | 0.98 | 1.697 | 55.5 |
| 18 | 8.505 | 6.05 | 1.498 | 82.5 |
| 19 | −18.386 | 1.50 | 1.624 | 47.0 |
| 20 | 231.449 | 3.50 | | |
| 21 | 7.487 | 4.68 | 1.603 | 65.4 |
| 22 | −61.353 | 7.36 | 1.729 | 54.7 |
| 23 | 3.041 | 2.86 | | |
| 24 | −2.308 | 4.98 | 1.713 | 53.9 |
| 25 | 60.987 | 3.99 | 1.786 | 44.2 |
| 26 | −8.232 | | | |

Immersion liquid nd = 1.515
νd = 41.4

Diffractive optical surface data
Tenth surface

κ = 1    A2 = −4.74734E−08    A4 = 2.57710E−10
A6 = −1.55521E−13    A8 = −4.49132E−14

Condition correspondence value (1) |θmax| = 4.1°
(2) |fdoe/fa| = 526.6
(3) |f2/fa| = 11.9
(4) |Φ2−1/Φ2−2| = 0.78
(5) N/H = 4.71
(6) νdmax = 82.5
(7) nd1 = 1.528

TABLE 4-continued (8) nF1 − nC1 = 0.0152
(9) nd2 = 1.557
(10) nF2 − nC2 = 0.011

Figure 4:
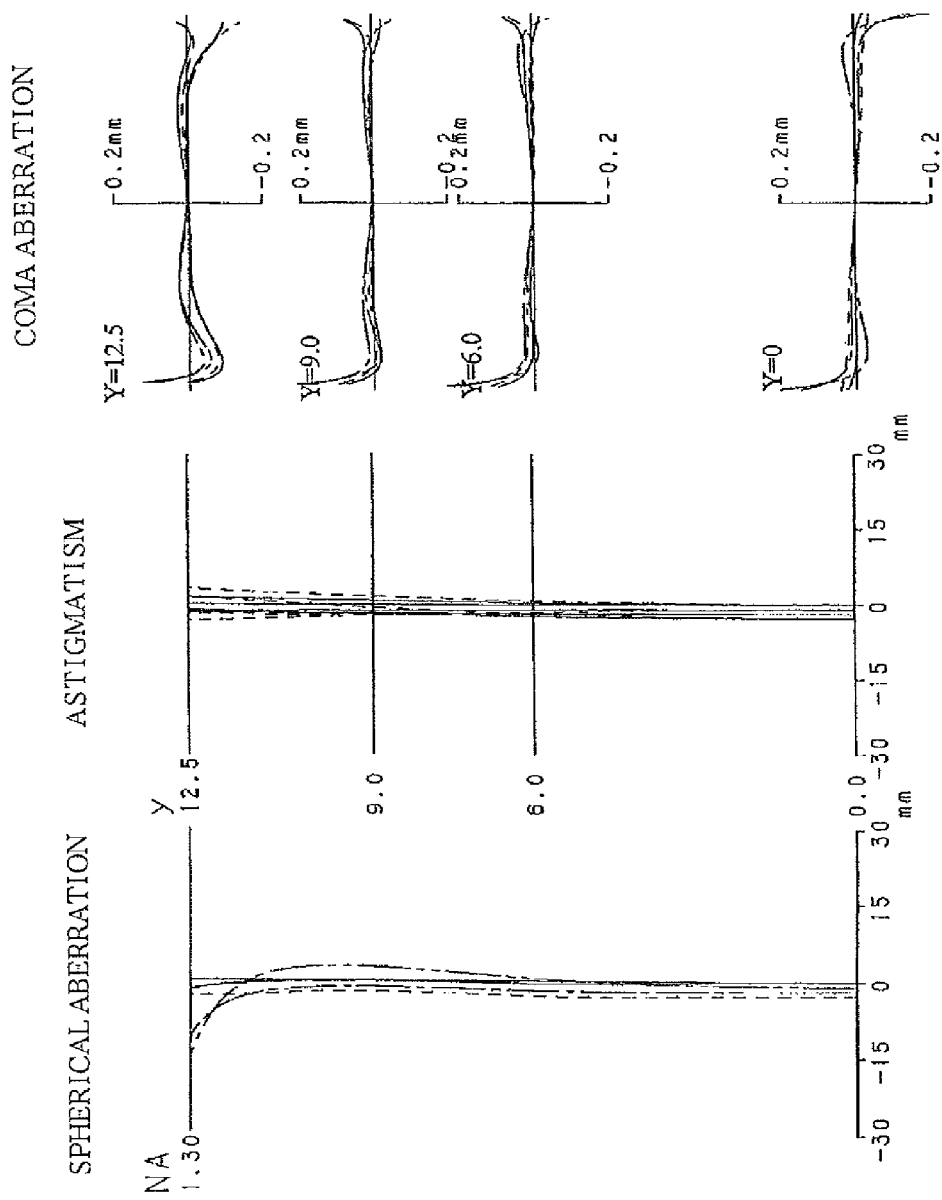
FIG. 4 are graphs showing various aberrations of the objective lens according to Example 2.

Among the condition correspondence values shown in Table 4, Φ2-1 in the conditional expression (4) indicates the power of the 23$^{rd}$ surface, and Φ2-2 indicates the power of the 24$^{th}$ surface. Thus in Example 2 as well, all of the conditional expressions (1) to (10) are satisfied. FIG. 4 are graphs showing various aberrations of spherical aberration, astigmatism and coma aberration of the objective lens OL2 according to Example 2. As each graph showing aberrations clarifies, various aberrations are corrected well, and an excellent image forming performance is assured in Example 2 as well.

Example 3

An objective lens OL3 shown in FIG. 5 will be described as Example 3. The objective lens OL3 shown in FIG. 5 as well is an objective lens used for a microscope in which a sample (object) is set under a cover plate C, and this sample is viewed in a state of the tip being dipped into immersion liquid, and comprises, in order from the object, that is, in order from the cover plate C, a first lens group G1 having positive refractive power, and a second lens group G2 having negative refractive power, and a diffractive optical element GD is disposed in the first lens group G1. The first lens group G1 includes: a plano-convex lens L1 having a plane facing the object and a sharp convex surface facing the image; a positive meniscus lens L2 having a concave surface facing the object; a positive meniscus lens L3 having a concave surface facing the object; a diffractive optical element GD; a cemented lens CL11 in which a bi-convex lens L8, a bi-concave lens L9 and a bi-convex lens L10 are cemented, and a cemented lens CL12 in which a negative meniscus lens L11 having a convex surface facing the object, a bi-convex lens L12 and a bi-concave lens L13 are cemented. The second lens group G2 includes: a cemented lens CL21 in which a bi-convex lens L14 and a bi-concave lens L15 having a concave surface with high curvature facing the image are cemented; a bi-concave negative lens L16 having a concave surface with high curvature facing the object; and a bi-convex lens L17.

In the diffractive optical element GD, an optical glass L4, two optical members L5 and L6 constituted by different resin materials, and optical glass L7 are cemented in this order, and diffraction grating grooves (diffractive optical surface D) are formed on the cemented surface of the optical members L5 and L6.

Figure 5:
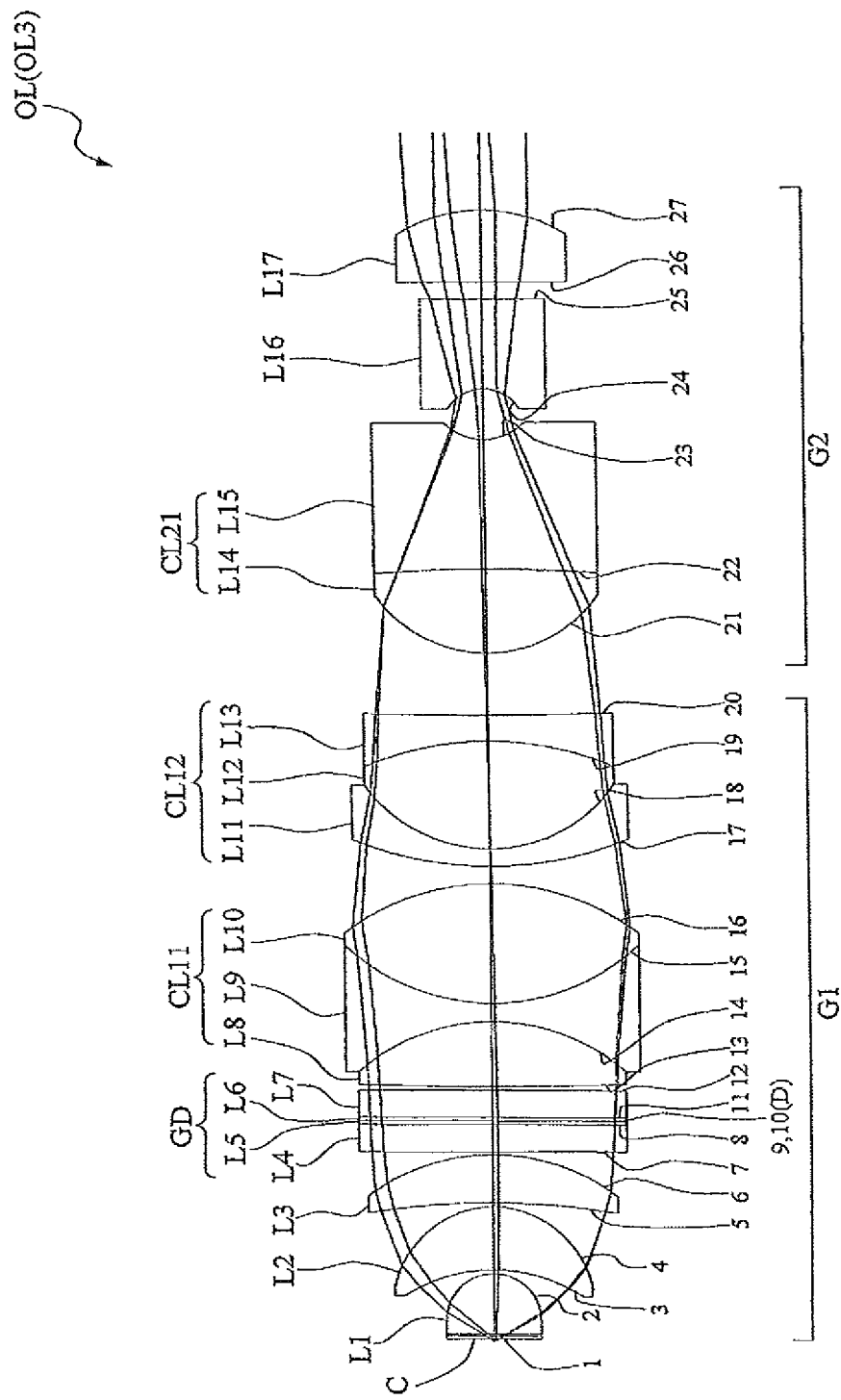
FIG. 5 is a diagram depicting the lens configuration of an objective lens according to Example 3 of an embodiment of the present invention.

Table 5 shows the data of the objective lens OL3 according to Example 3 in FIG. 5. The surface numbers in Table 5 correspond to the surface numbers 1 to 27 shown in FIG. 5.

TABLE 5 fa = 2.0
NA = 1.3
d0 = 0.22
β = 100X

| m | r | d | nd | νd |
|---|---|---|---|---|
| 1 | 0.000 | 3.39 | 1.518 | 59.0 |
| 2 | −2.663 | 0.22 | | |
| 3 | −9.109 | 3.48 | 1.603 | 65.4 |
| 4 | −5.654 | 0.24 | | |
| 5 | −41.641 | 2.63 | 1.603 | 65.4 |
| 6 | −11.836 | 0.16 | | |
| 7 | 0.000 | 1.50 | 1.518 | 59.0 |
| 8 | 0.000 | 0.20 | 1.557 | 50.2 |
| 9 | 0.000 | 0.00 | 10001.000 | −3.5 |
| 10* | 0.000 | 0.20 | 1.528 | 34.7 |
| 11 | 0.000 | 1.50 | 1.518 | 59.0 |
| 12 | 0.000 | 0.20 | | |
| 13 | 194.205 | 3.63 | 1.498 | 82.5 |
| 14 | −11.489 | 1.03 | 1.606 | 43.7 |
| 15 | 12.046 | 6.72 | 1.498 | 82.5 |
| 16 | −13.587 | 0.99 | | |
| 17 | 20.465 | 0.97 | 1.697 | 55.5 |
| 18 | 8.573 | 6.04 | 1.498 | 82.5 |
| 19 | −18.094 | 1.50 | 1.618 | 49.8 |
| 20 | 253.129 | 3.49 | | |
| 21 | 7.652 | 4.66 | 1.620 | 60.3 |
| 22 | −85.258 | 7.35 | 1.720 | 50.2 |
| 23 | 3.106 | 2.84 | | |
| 24 | −2.325 | 4.98 | 1.720 | 50.2 |
| 25 | 151.126 | 0.98 | | |
| 26 | −288.713 | 3.99 | 1.786 | 44.2 |
| 27 | −9.000 | | | |

Immersion liquid nd = 1.515
νd = 41.4

Diffractive optical surface data
Tenth surface

κ = 1   A2 = −6.81197E−08   A4 = 3.08352E−10
A6 = −6.70196E−14   A8 = −6.32486E−14

Condition correspondence value (1) |θmax| = 3.7°
(2) |fdoe/fa| = 367.0
(3) |f2/fa| = 12.1
(4) |Φ2 − 1/Φ2 − 2| = 0.75
(5) N/H = 7.10
(6) νdmax = 82.5
(7) nd1 = 1.528
(8) nF1 − nC1 = 0.0152
(9) nd2 = 1.557
(10) nF2 − nC2 = 0.011

Figure 6:
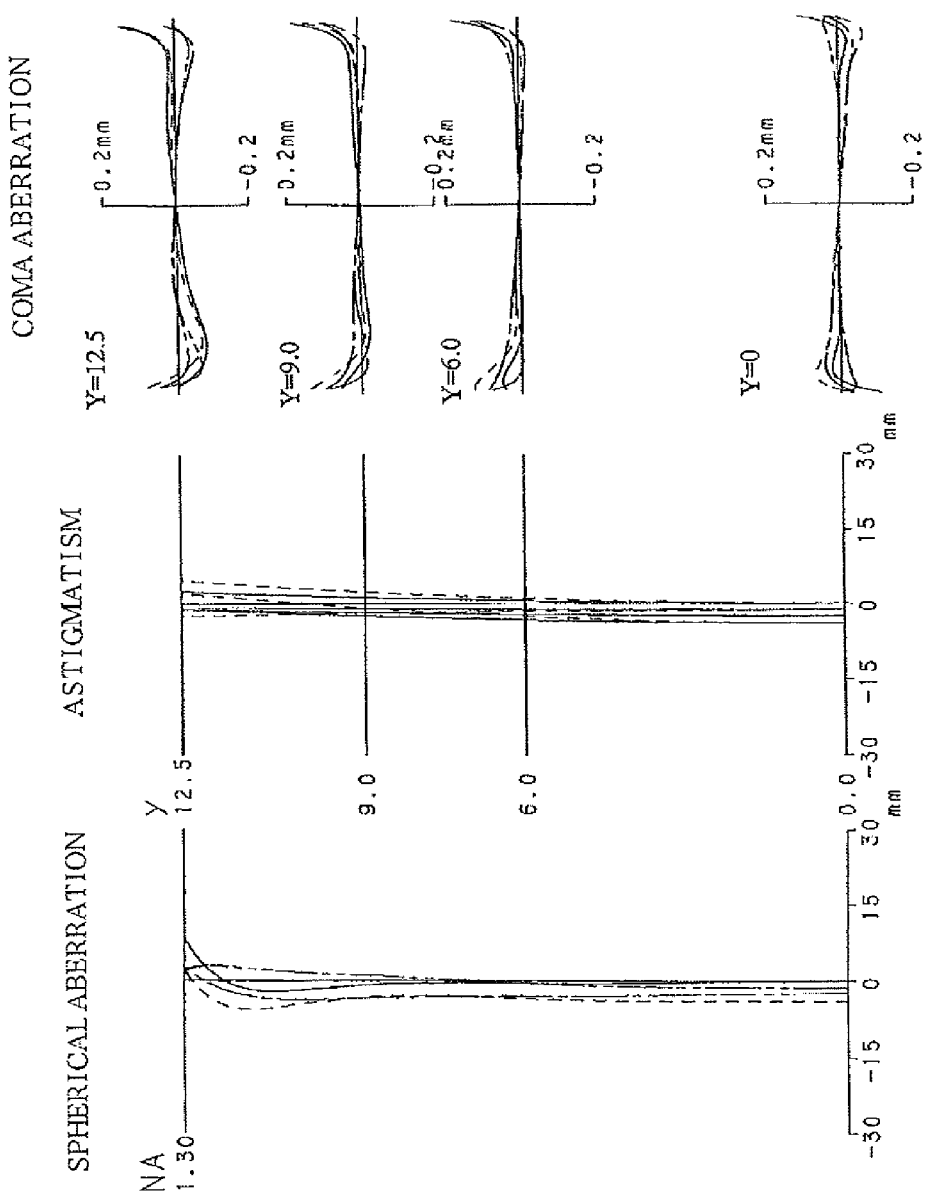
FIG. 6 are graphs showing various aberrations of the objective lens according to Example 3.

Among the condition correspondence values shown in Table 5, Φ2-1 in the conditional expression (4) indicates the power of the 23$^{rd}$ surface, and Φ2-2 indicates the power of the 24$^{th}$ surface. Thus in Example 3 as well, all of the conditional expressions (1) to (10) are satisfied. FIG. 6 are graphs showing various aberrations of spherical aberration, astigmatism and coma aberration of the objective lens OL3 according to Example 3. As each graph showing aberrations clarifies, various aberrations are corrected well, and an excellent image forming performance is assured in Example 3 as well.

Example 4

Now an objective lens OL4 shown in FIG. 7 will be described as Example 4. The objective lens OL4 shown in FIG. 7 as well is an objective lens used for a microscope in which a sample (object) is set under a cover plate C, and this sample is viewed in a state of the tip being dipped into immersion liquid, and comprises, in order from the object, that is, in order from the cover plate C, a first lens group G1 having positive refractive power, and a second lens group G2 having negative refractive power, and a diffractive optical element GD is disposed in the first lens group G1. The first lens group G1 includes: a cemented lens CL11 in which a plano-convex lens L1 having a plane facing the object and a positive meniscus lens L2 having a sharp convex surface facing the image are cemented; a positive meniscus lens L3 having a concave surface facing the object; a cemented lens CL12 in which a bi-concave lens L4 and a bi-convex lens L5 are cemented; a cemented lens CL13 which includes a diffractive optical surface D, and in which a plano-concave lens L9 having a concave surface facing the image (diffractive optical element GD) and a bi-convex lens L10 are cemented; a cemented lens CL14 in which a negative meniscus lens L11 having a convex surface facing the object and a bi-convex lens L12 are cemented; and a cemented lens CL15 in which a negative meniscus lens L13 having a convex surface facing the object, a bi-convex lens L14 and a bi-concave lens L15 are cemented. The second lens group G2 includes: a cemented lens CL21 in which a bi-convex lens L16 and a bi-concave lens L17 having a concave surface with high curvature facing the image are cemented; and a cemented lens CL22 in which a bi-concave lens L18 having a concave surface with high curvature facing the object and a bi-convex lens L19 are cemented.

In the diffractive optical element GD, an optical glass L6, two optical members L7 and L8 constituted by different resin materials, and optical glass (plano-concave lens) L9, are cemented in this order, and diffraction grating grooves (diffractive optical surface D) are formed on the cemented surface of the optical members L7 and L8.

Figure 7:
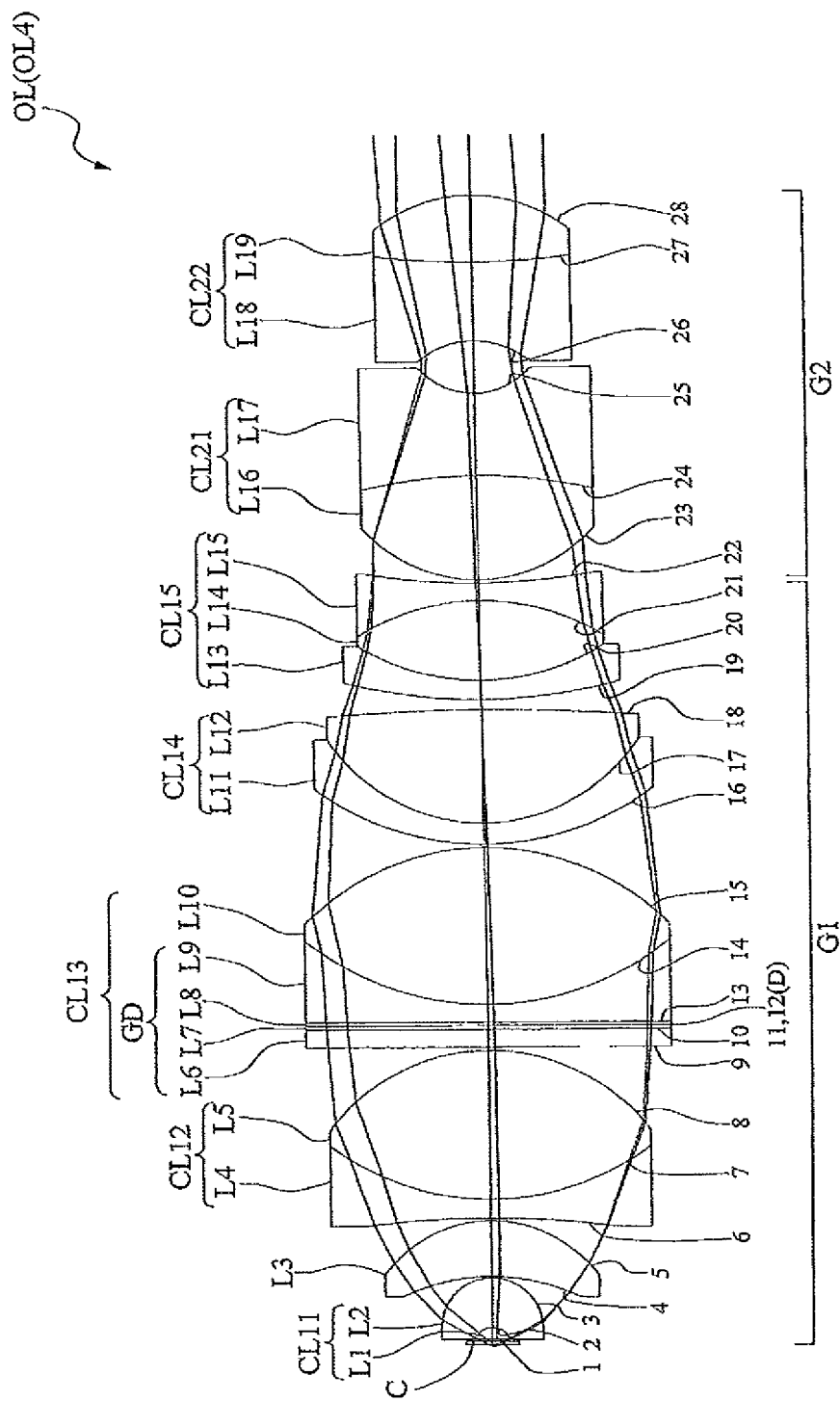
FIG. 7 is a diagram depicting the lens configuration of an objective lens according to Example 4 of an embodiment of the present invention.

Table 6 shows the data of the objective lens OL4 according to Example 4 in FIG. 7. The surface numbers in Table 6 correspond to the surface numbers 1 to 28 shown in FIG. 7.

TABLE 6 fa = 3.33
NA = 1.25
d0 = 0.25
β = 60X

| m | r | d | nd | vd |
|---|---|---|---|---|
| 1 | −10.541 | 0.63 | 1.459 | 67.8 |
| 2 | −1.052 | 2.78 | 1.835 | 42.7 |
| 3 | −2.853 | 0.07 | | |
| 4 | −11.763 | 3.10 | 1.640 | 60.1 |
| 5 | −7.499 | 0.16 | | |
| 6 | −53.223 | 1.00 | 1.532 | 48.9 |
| 7 | 15.092 | 8.29 | 1.498 | 82.5 |
| 8 | −11.321 | 0.19 | | |
| 9 | 0.000 | 1.00 | 1.517 | 64.1 |
| 10 | 0.000 | 0.20 | 1.557 | 50.2 |
| 11 | 0.000 | 0.00 | 10001.000 | −3.5 |
| 12* | 0.000 | 0.20 | 1.528 | 34.7 |
| 13 | 0.000 | 0.99 | 1.816 | 46.6 |
| 14 | 16.292 | 8.80 | 1.498 | 82.5 |
| 15 | −14.429 | 0.19 | | |
| 16 | 16.095 | 1.18 | 1.744 | 44.8 |
| 17 | 10.516 | 6.30 | 1.498 | 82.5 |
| 18 | −119.471 | 0.58 | | |
| 19 | 30.083 | 1.09 | 1.816 | 46.6 |
| 20 | 13.025 | 4.49 | 1.498 | 82.5 |
| 21 | −13.110 | 1.00 | 1.816 | 46.6 |
| 22 | 37.709 | 0.18 | | |
| 23 | 8.701 | 5.90 | 1.603 | 60.7 |
| 24 | −27.147 | 4.61 | 1.618 | 63.3 |
| 25 | 4.242 | 2.87 | | |
| 26 | −4.919 | 4.42 | 1.603 | 65.4 |
| 27 | 42.136 | 3.73 | 1.596 | 39.2 |
| 28 | −8.910 | | | |

Immersion liquid nd = 1.333
vd = 55.9

Diffractive optical surface data
Twelfth surface

κ = 1  A2 = −2.20000E−08  A4 = −3.48972E−13
A6 = −6.90107E−15  A8 = 1.40411E−15

TABLE 6-continued

Condition correspondence value (1) |θmax| = 4.0°
(2) |fdoe/fa| = 682.5
(3) |f2/fa| = 19.4
(4) |Φ2 − 1/Φ2 − 2| = 1.19
(5) N/H = 3.39
(6) vdmax = 82.5
(7) nd1 = 1.528
(8) nF1 − nC1 = 0.0152
(9) nd2 = 1.557
(10) nF2 − nC2 = 0.011

Figure 8:
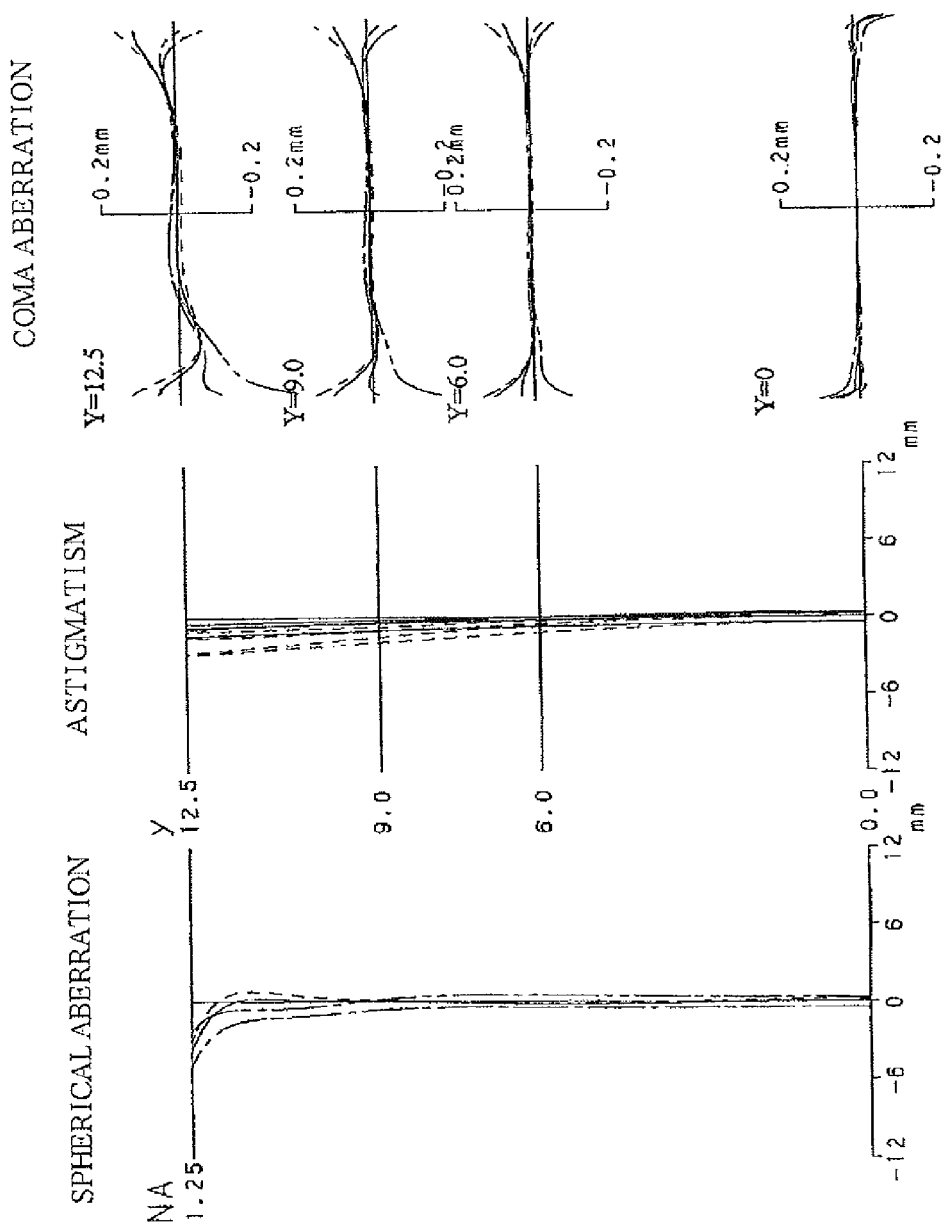
FIG. 8 are graphs showing various aberrations of the objective lens according to Example 4.

Among the condition correspondence values shown in Table 6, Φ2-1 in conditional expression (4) indicates the power of the 25$^{th}$ surface, and Φ2-2 indicates the power of the 26$^{th}$ surface. Thus in Example 4 as well, all of the conditional expressions (1) to (10) are satisfied. FIG. 8 are graphs showing various aberrations of spherical aberration, astigmatism and coma aberration of the objective lens OL4 according to Example 4. As each graph showing aberrations clarifies, various aberrations are corrected well, and an excellent image forming performance is assured in Example 4 as well.

Example 5

Now an objective lens OL5 shown in FIG. 9 will be described as Example 5. The objective lens OL5 shown in FIG. 9 as well is an objective lens used for a microscope in which a sample (object) is set under a cover plate C, and this sample is viewed in a state of the tip being dipped into immersion liquid, and comprises, in order from the object, that is, in order from the cover plate C, a first lens group G1 having positive refractive power, and a second lens group G2 having negative refractive power, and a diffractive optical element GD is disposed in the first lens group G1. The first lens group G1 includes: a cemented lens CL11 in which a plano-convex lens L1 having a plane facing the object and a positive meniscus lens L2 having a sharp convex surface facing the image are cemented; a positive meniscus lens L3 having a concave surface facing the object; a cemented lens CL12 in which a bi-concave lens L4 and a bi-convex lens L5 are cemented; a cemented lens CL13 which includes a diffractive optical surface D, and in which a plano-concave lens L9 having a concave surface facing the image (diffractive optical element GD) and a bi-convex lens L10 are cemented; a cemented lens CL14 in which a negative meniscus lens L11 having a convex surface facing the object and a bi-convex lens L12 are cemented; and a cemented lens CL15 in which a negative meniscus lens L13 having a convex surface facing the object, a bi-convex lens L14 and a bi-concave lens L15 are cemented. The second lens group G2 includes: a cemented lens CL21 in which a bi-convex lens L16 and a bi-concave lens L17 having a concave surface with high curvature facing the image are cemented; and a cemented lens CL22 in which a bi-concave lens L18 having a concave surface with high curvature facing the object and a bi-convex lens L19 are cemented.

In the diffractive optical element GD, an optical glass L6, two optical members L7 and L8 constituted by different resin materials, and optical glass (plano-concave lens) L9, are cemented in this order, and diffraction grating grooves (diffractive optical surface D) are formed on the cemented surface of the optical members L7 and L8.

Figure 9:
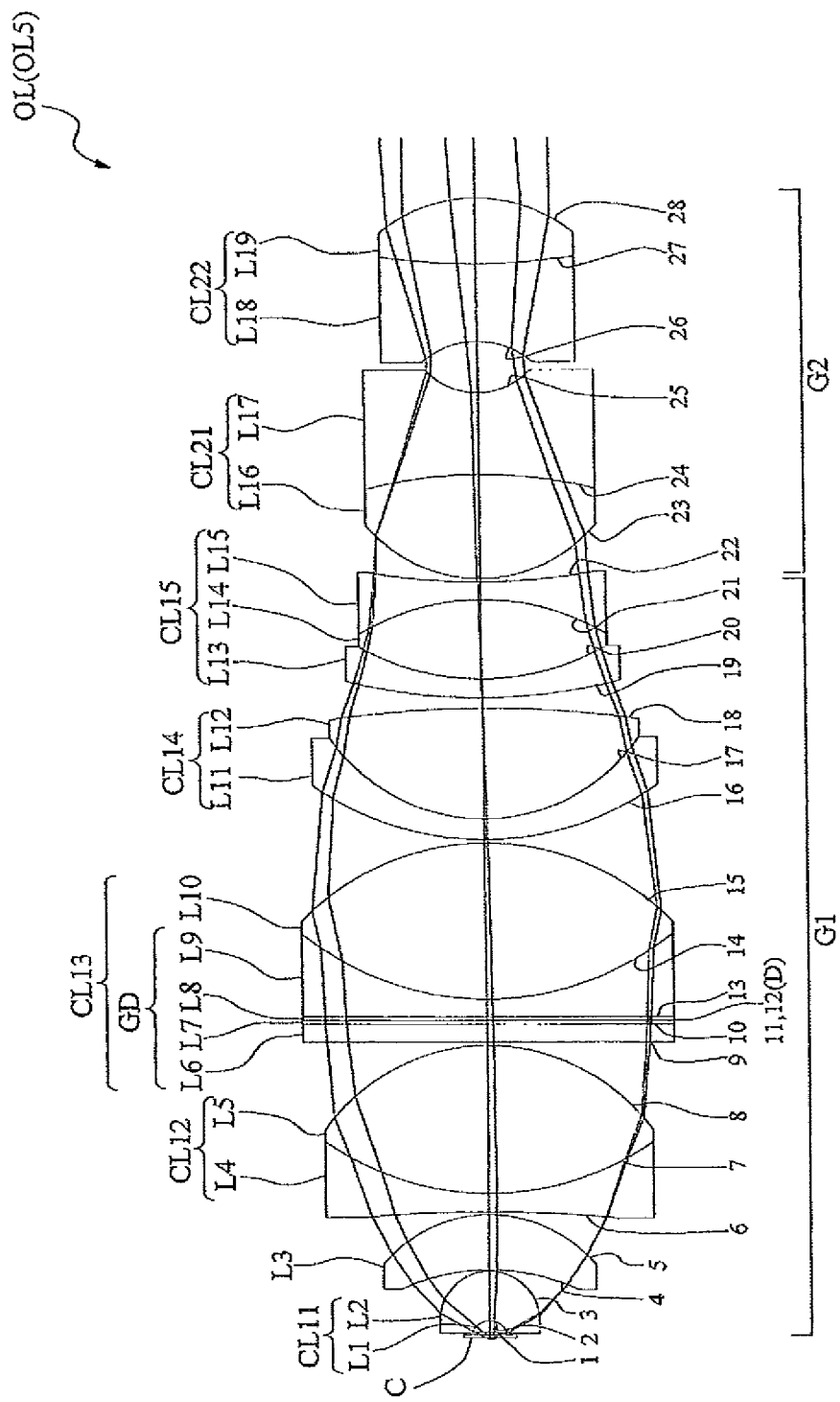
FIG. 9 is a diagram depicting the lens configuration of an objective lens according to Example 5 of an embodiment of the present invention.

Table 7 shows the data of the objective lens OL5 according to Example 5 in FIG. 9. The surface numbers in Table 7 correspond to the surface numbers 1 to 28 shown in FIG. 9.

TABLE 7 fa = 3.33
NA = 1.25
d0 = 0.25
β = 60X

| m | r | d | nd | νd |
|---|---|---|---|---|
| 1 | −11.217 | 0.63 | 1.459 | 67.8 |
| 2 | −1.054 | 2.79 | 1.835 | 42.7 |
| 3 | −2.842 | 0.08 | | |
| 4 | −11.932 | 3.09 | 1.640 | 60.1 |
| 5 | −7.858 | 0.16 | | |
| 6 | −78.438 | 1.01 | 1.548 | 45.8 |
| 7 | 16.224 | 8.30 | 1.498 | 82.5 |
| 8 | −11.409 | 0.19 | | |
| 9 | 0.000 | 1.00 | 1.517 | 64.1 |
| 10 | 0.000 | 0.20 | 1.557 | 50.2 |
| 11 | 0.000 | 0.00 | 10001.000 | −3.5 |
| 12* | 0.000 | 0.20 | 1.528 | 34.7 |
| 13 | 0.000 | 1.00 | 1.816 | 46.6 |
| 14 | 16.819 | 8.80 | 1.498 | 82.5 |
| 15 | −14.609 | 0.20 | | |
| 16 | 16.818 | 1.19 | 1.773 | 49.6 |
| 17 | 10.584 | 6.30 | 1.498 | 82.5 |
| 18 | −61.560 | 0.59 | | |
| 19 | 30.611 | 1.09 | 1.816 | 46.6 |
| 20 | 14.009 | 4.49 | 1.498 | 82.5 |
| 21 | −13.593 | 0.99 | 1.816 | 46.6 |
| 22 | 37.430 | 0.18 | | |
| 23 | 8.472 | 5.89 | 1.603 | 65.4 |
| 24 | −25.872 | 4.59 | 1.652 | 58.5 |
| 25 | 4.147 | 2.87 | | |
| 26 | −4.779 | 4.42 | 1.603 | 65.4 |
| 27 | 35.900 | 3.73 | 1.596 | 39.2 |
| 28 | −8.672 | | | |

Immersion liquid nd = 1.333
νd = 55.9

Diffractive optical surface data
Twelfth surface

κ = 1   A2 = −1.83289E−08   A4 = −8.47811E−13
A6 = −1.23765E−14   A8 = 2.60069E−15

Condition correspondence value (1) |θmax| = 4.2°
(2) |fdoe/fa| = 819.2
(3) |f2/fa| = 16.4
(4) |Φ2 − 1/Φ2 − 2| = 1.25
(5) N/H = 2.70
(6) νdmax = 82.5
(7) nd1 = 1.528
(8) nF1 − nC1 = 0.0152
(9) nd2 = 1.557
(10) nF2 − nC2 = 0.011

Figure 10:
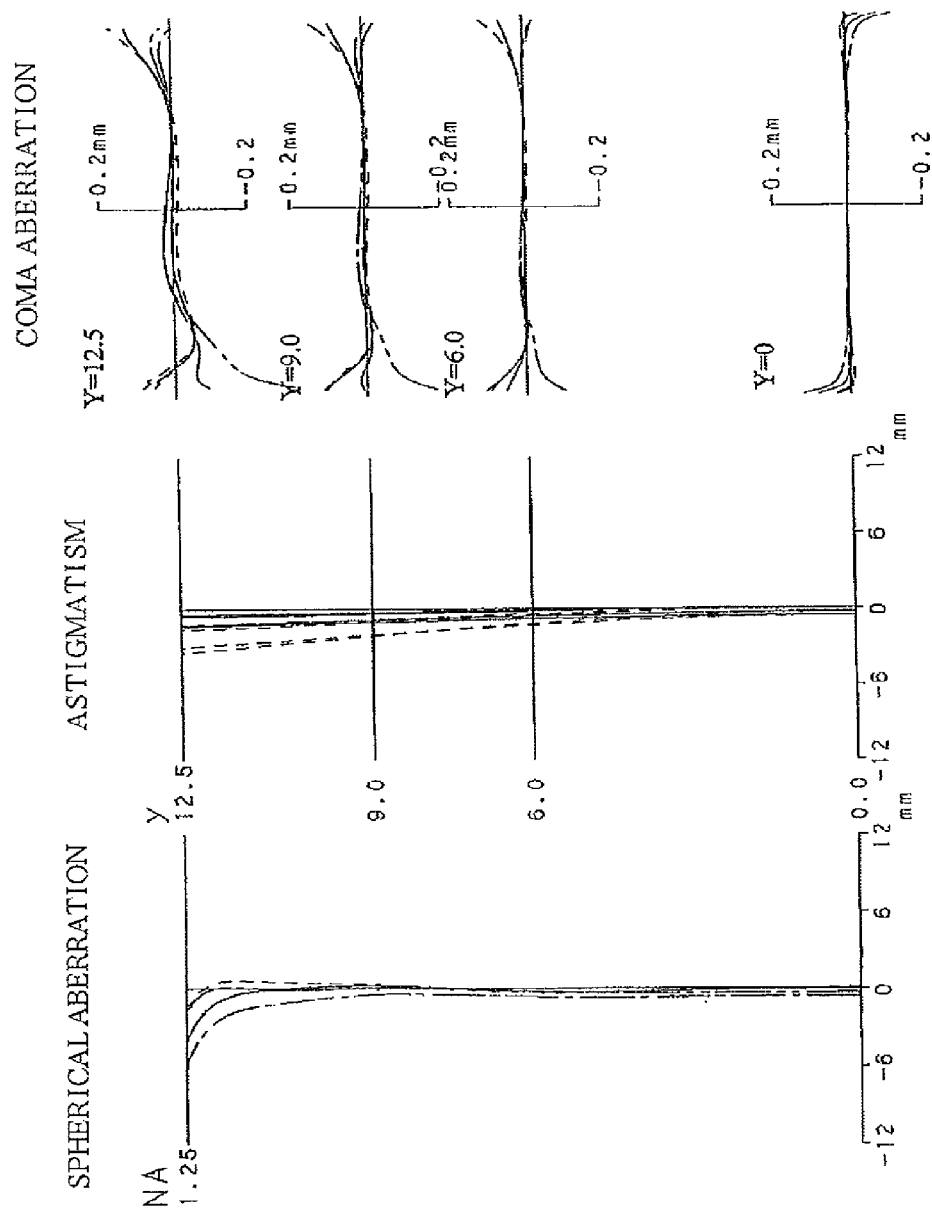
FIG. 10 are graphs showing various aberrations of the objective lens according to Example 5.

Among the condition correspondence values shown in Table 7, Φ2-1 in conditional expression (4) indicates the power of the 25$^{th}$ surface, and Φ2-2 indicates the power of the 26$^{th}$ surface. Thus in Example 5 as well, all of the conditional expressions (1) to (10) are satisfied. FIG. 10 are graphs showing various aberrations of spherical aberration, astigmatism and coma aberration of the objective lens OL5 according to Example 5. As each graph showing aberrations clarifies, various aberrations are corrected well, and an excellent image forming performance is assured in Example 5 as well.

Example 6

Figure 11:
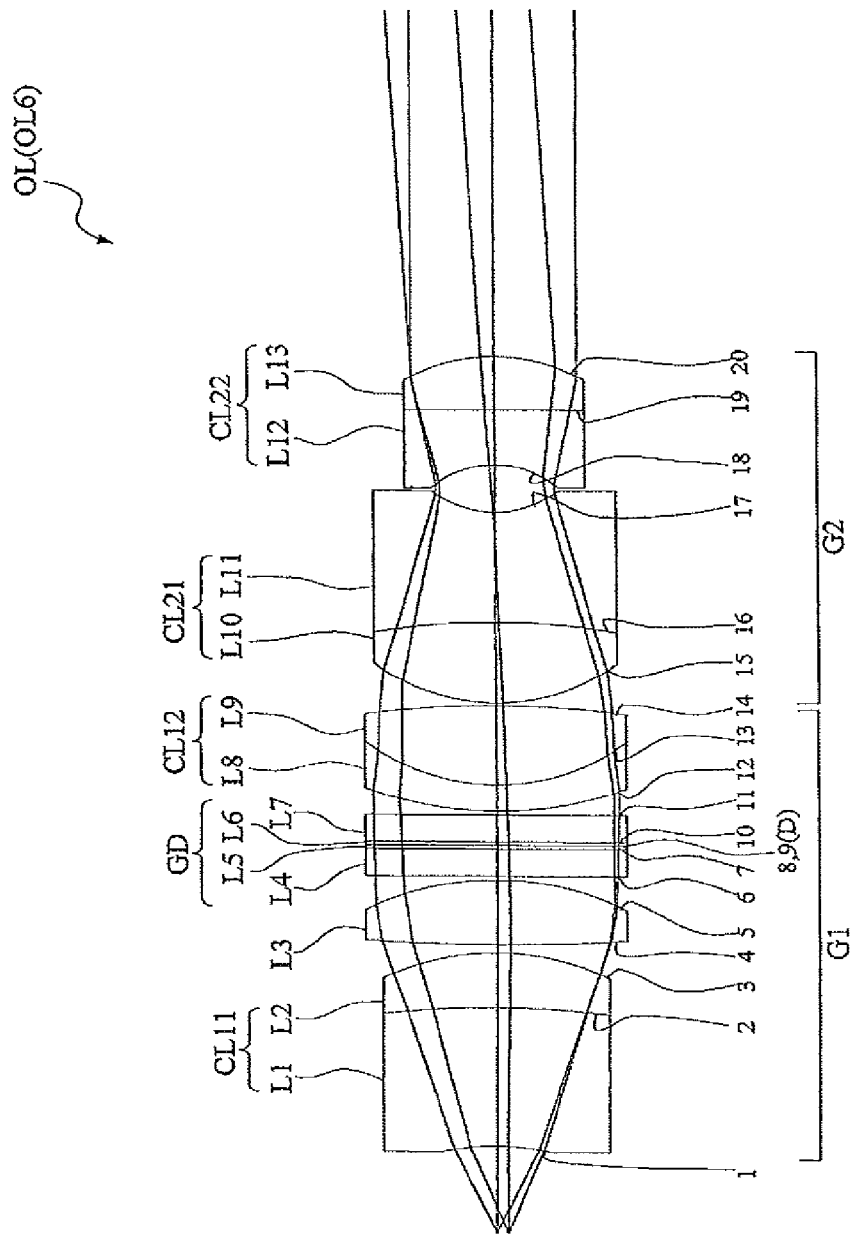
FIG. 11 is a diagram depicting the lens configuration of an objective lens according to Example 6 of an embodiment of the present invention.

Now an objective lens OL6 shown in FIG. 11 will be described as Example 6. The objective lens OL6 shown in FIG. 11 is a dry objective lens comprising, in order from the object, a first lens group G1 having positive refractive power and a second lens group G2 having negative refractive power, and a diffractive optical element GD is disposed in the first lens group G1. The first lens group G1 includes: a cemented lens CL11 in which a positive meniscus lens L1 having a concave surface with low curvature facing the object and a positive meniscus lens L2 having a sharp convex surface facing the image are cemented; a bi-convex positive lens L3, a diffractive optical element GD, and a cemented lens CL12 in which a negative meniscus lens L8 having a convex surface facing the object and a bi-convex lens L9 are cemented. The second lens group G2 includes: a cemented lens CL21 in which a bi-convex lens L10 and a bi-concave lens L11 having a concave surface with high curvature facing the image are cemented; and a cemented lens CL22 in which a bi-concave lens L12 having a concave surface with high curvature facing the object and a bi-convex lens L13 are cemented.

In the diffractive optical element GD, an optical glass L4, two optical members L5 and L6 constituted by different resin materials, and optical glass L7 are cemented in this order, and a diffraction grating grooves (diffractive optical surface D) are formed on the cemented surface of the optical members L5 and L6.

Table 8 shows the data of the objective lens OL6 according to Example 6 in FIG. 11. The surface numbers in Table 8 correspond to the surface numbers 1 to 20 shown in FIG. 11.

TABLE 8 fa = 10.00
NA = 0.46
d0 = 4.68
β = 20X

| m | r | d | nd | νd |
|---|---|---|---|---|
| 1 | −14.879 | 7.57 | 1.804 | 39.6 |
| 2 | −55.780 | 3.03 | 1.652 | 58.5 |
| 3 | −14.805 | 0.46 | | |
| 4 | 104.559 | 3.58 | 1.603 | 65.4 |
| 5 | −16.598 | 0.20 | | |
| 6 | 0.000 | 1.50 | 1.517 | 64.1 |
| 7 | 0.000 | 0.20 | 1.557 | 50.2 |
| 8 | 0.000 | 0.00 | 10001.000 | −3.5 |
| 9* | 0.000 | 0.20 | 1.528 | 34.7 |
| 10 | 0.000 | 1.50 | 1.517 | 64.1 |
| 11 | 0.000 | 0.20 | | |
| 12 | 21.497 | 1.46 | 1.795 | 28.7 |
| 13 | 12.079 | 4.46 | 1.498 | 82.5 |
| 14 | −55.112 | 0.16 | | |
| 15 | 11.530 | 4.50 | 1.603 | 65.4 |
| 16 | −38.752 | 6.20 | 1.639 | 44.9 |
| 17 | 5.779 | 2.61 | | |
| 18 | −5.441 | 2.99 | 1.583 | 46.4 |
| 19 | 555.043 | 2.99 | 1.723 | 38.0 |
| 20 | −10.034 | | | |

Diffractive optical surface data
Ninth surface

κ = 1   A2 = −4.55967E−08   A4 = −3.98721E−11
A6 = 1.74410E−13   A8 = −3.52316E−15

Condition correspondence value (1) |θmax| = 2.6°
(2) |fdoe/fa| = 109.7
(3) |f2/fa| = 4.9
(4) |Φ2 − 1/Φ2 − 2| = 1.03
(5) N/H = 5.59
(6) νdmax = 82.5
(7) nd1 = 1.528
(8) nF1 − nC1 = 0.0152
(9) nd2 = 1.557
(10) nF2 − nC2 = 0.011

Figure 12:
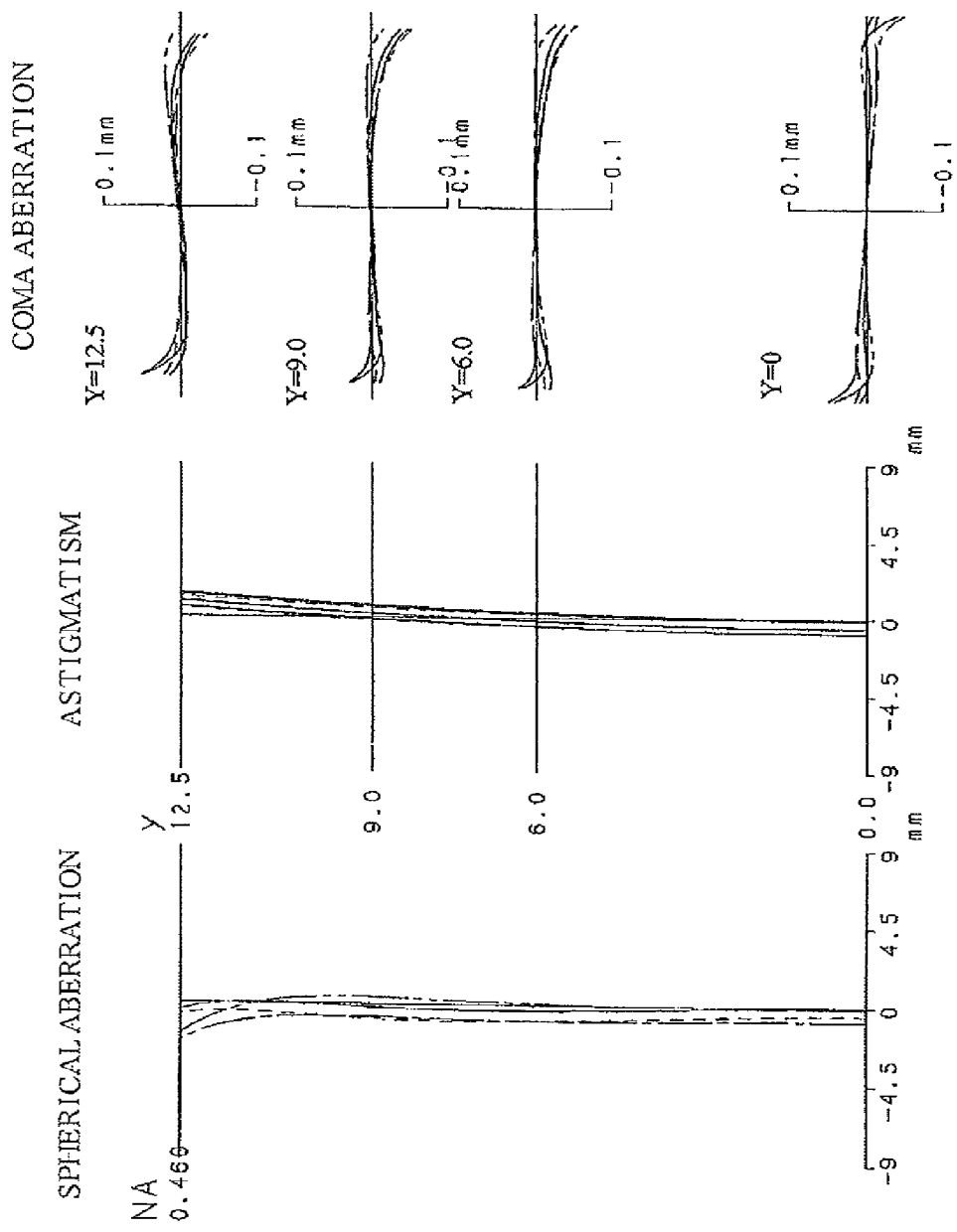
FIG. 12 are graphs showing various aberrations of the objective lens according to Example 6.

Among the condition correspondence values shown in Table 8, Φ2-1 in conditional expression (4) indicates the power of the 17$^{th}$ surface, and Φ2-2 indicates the power of the 18$^{th}$ surface. Thus in Example 6 as well, all of the conditional expressions (1) to (10) are satisfied. FIG. 12 are graphs showing various aberrations of spherical aberration, astigmatism and coma aberration of the objective lens OL6 according to Example 6. As each graph showing aberrations clarifies, various aberrations are corrected well, and an excellent image forming performance is assured in Example 6 as well.

Example 7

Figure 13:
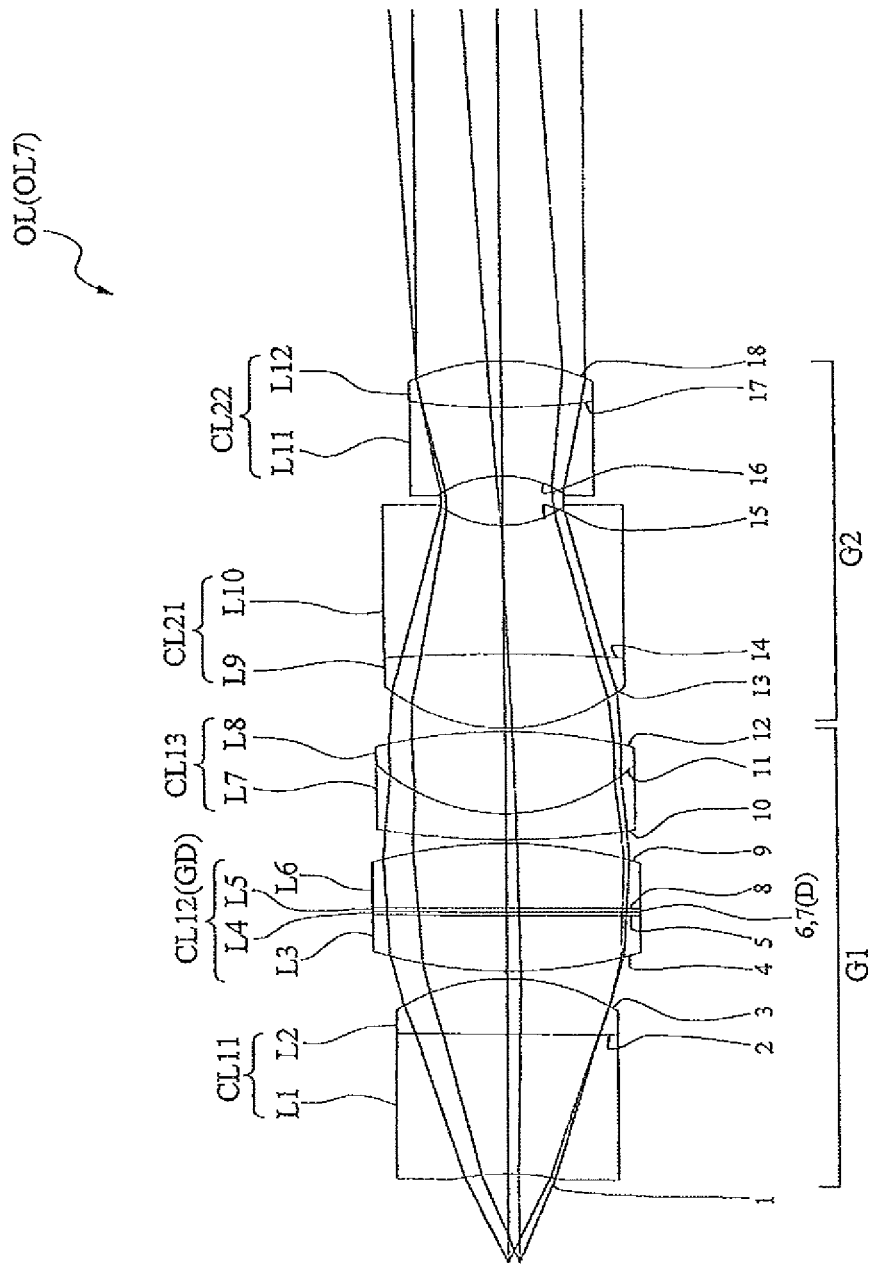
FIG. 13 is a diagram depicting the lens configuration of an objective lens according to Example 7 of an embodiment of the present invention.

Now the objective lens OL7 shown in FIG. 13 will be described as Example 7. The objective lens OL7 shown in FIG. 13 is a dry objective lens, comprising, in order from the object, a first lens group G1 having positive refractive power and a second lens group G2 having negative refractive power, and a diffractive optical element GD is disposed in the first lens group G1. The first lens group G1 includes: a cemented lens CL11 in which a bi-concave lens L1 having a concave surface with low curvature facing the object, and a bi-convex lens L2 having a sharp convex surface facing the image are cemented; and a cemented lens L12 (diffractive optical element GD) which includes a diffractive optical surface D and cements a plano-convex lens L3 having a convex surface facing the object and a plano-convex lens L4 having a convex surface facing the image; and a cemented lens CL13 in which a negative meniscus lens L7 having a convex surface facing the object and a bi-convex lens L8 are cemented. The second lens group G2 includes: a cemented lens CL21 in which a bi-convex lens L9 and a bi-concave lens L10 having a concave surface with high curvature facing the image are cemented; and a cemented lens CL22 in which a bi-concave lens L11 having a concave surface with high curvature facing the object and a bi-convex lens L12 are cemented.

In the diffractive optical element GD, two optical members L4 and L5 constituted by different resin materials are cemented in this order between the lenses L3 and L6, and diffraction grating grooves (diffractive optical surface D) are formed on the cemented surface of the optical members L4 and L5.

Table 9 shows the data of the objective lens OL7 according to Example 7 in FIG. 13. The surface numbers in Table 9 correspond to the surface numbers 1 to 18 shown in FIG. 13.

TABLE 9 fa = 10.00
NA = 0.46
d0 = 4.68
β = 20X

| m | r | d | nd | vd |
|---|---|---|---|---|
| 1 | −15.373 | 7.49 | 1.786 | 44.2 |
| 2 | 1902.674 | 2.99 | 1.620 | 60.3 |
| 3 | −11.344 | 0.40 | | |
| 4 | 25.437 | 3.00 | 1.617 | 54.0 |
| 5 | 0.000 | 0.20 | 1.557 | 50.2 |
| 6 | 0.000 | 0.00 | 10001.000 | −3.5 |
| 7* | 0.000 | 0.20 | 1.528 | 34.7 |
| 8 | 0.000 | 3.50 | 1.617 | 54.0 |
| 9 | −25.335 | 0.21 | | |
| 10 | 46.511 | 1.41 | 1.804 | 39.6 |
| 11 | 10.510 | 4.50 | 1.498 | 82.5 |
| 12 | −30.007 | 0.20 | | |
| 13 | 10.555 | 4.01 | 1.603 | 65.4 |
| 14 | −91.996 | 7.00 | 1.702 | 41.2 |
| 15 | 6.007 | 2.70 | | |

TABLE 9-continued

| 16 | −6.259 | 3.69 | 1.581 | 40.7 |
|---|---|---|---|---|
| 17 | 38.618 | 2.54 | 1.749 | 35.3 |
| 18 | −11.756 | | | |

Diffractive optical surface data
Seventh surface

κ = 1    A2 = −4.61565E−08    A4 = −2.28998E−12
A6 = 8.36695E−13    A8 = −1.04070E−15

Condition correspondence value (1) |θmax| = 4.8°
(2) |fdoe/fa| = 108.3
(3) |f2/fa| = 7.2
(4) |Φ2 − 1/Φ2 − 2| = 1.26
(5) N/H = 5.08
(6) vdmax = 82.5
(7) nd1 = 1.528
(8) nF1 − nC1 = 0.0152
(9) nd2 = 1.557
(10) nF2 − nC2 = 0.011

Figure 14:
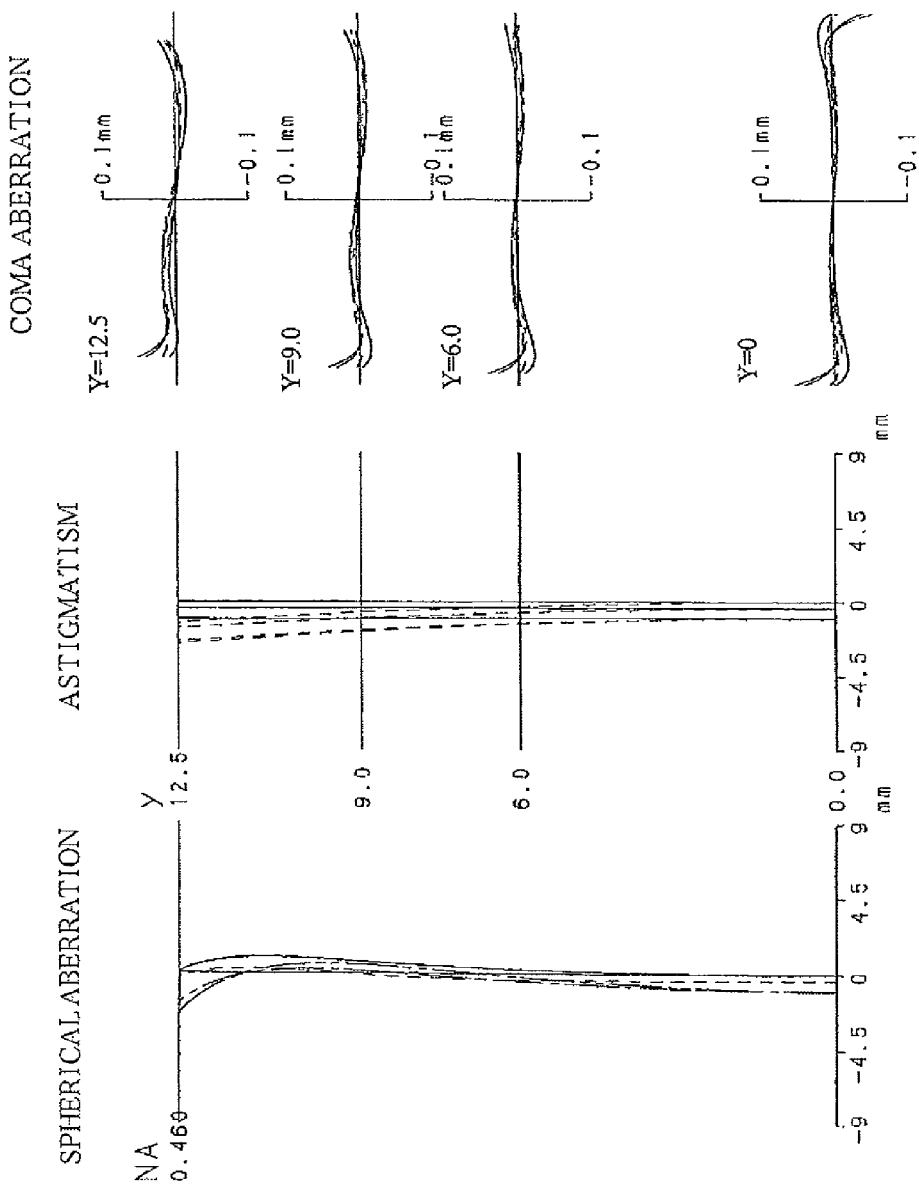
FIG. 14 are graphs showing various aberrations of the objective lens according to Example 7.

Among the condition correspondence values shown in Table 9, Φ2-1 in conditional expression (4) indicates the power of the 15$^{th}$ surface, and Φ2-2 indicates the power of the 16$^{th}$ surface. Thus in Example 7 as well, all of the conditional expressions (1) to (10) are satisfied. FIG. 14 are graphs showing various aberrations of spherical aberration, astigmatism and coma aberration of the objective lens OL7 according to Example 7. As each graph showing Aberrations clarifies, various aberrations are corrected well, and an excellent image forming performance is assured in Example 7 as well.

All examples and conditional language recited herein are intended for pedagogical objects to aid the reader in understanding the invention and the concepts contributed by the inventors to furthering the art, and are to be construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:
1. An objective lens, consisting of:
in order from an object, a first lens group having positive refractive power as a whole, and a second lens group having negative refractive power as a whole, wherein
the first lens group including: a positive lens which is disposed closest to the object and of which lens surface closest to the object is a plane or a concave surface; a diffractive optical element in which two diffractive element constituents made from different optical materials are cemented and which has a diffractive optical surface formed with diffraction grating grooves on the cemented surface,
the second lens group including a first lens having a concave surface facing an image and a second lens having a concave surface facing the object, the two concave surfaces of the first and second lenses facing with each other, and the second lens group being disposed closest to the image wherein a diameter of a light bundle is the smallest at one of the concave surfaces of the first and the second lenses in the second lens group,
the following conditional expression is satisfied:

$3 \leq |f2/fa| \leq 30$ where fa denotes a focal length of the objective lens, and f2 denotes a focal length of the second lens group, the power $\Phi$ of a lens surface being defined by $$\Phi=(n'-n)/r$$

where r denotes a radius of curvature of the lens surface, and n and n' are refractive indexes at the d-line of media before and after the lens surface, and
the following conditional expression is satisfied:

$$1.03 \leq |\Phi2\text{-}1/\Phi2\text{-}2| \leq 1.4$$

where $\Phi2$-1 denotes a power of the concave surface facing the image, and $\Phi2$-2 denotes a power of the concave surface facing the object in the second lens group.

2. The objective lens according to claim 1, wherein the diffractive optical element is disposed closer to the object than a position where a principal ray crosses the optical axis,
the following conditional expression is satisfied:

$$|\theta max| \leq 10°$$

where $\theta$max denotes a maximum incident angle of a ray that enters the diffractive optical element, and
the following conditional expression is satisfied:

$$|fdoe/fa| \geq 100$$

where fa denotes a focal length of the objective lens, and fdoe is a focal length of the diffractive optical element.

3. The objective lens according to claim 2, wherein the following conditional expression is satisfied:

$$2 \leq N/H \leq 10$$

where N denotes a number of diffraction grating grooves on the diffractive optical surface in the diffractive optical element, and H denotes an effective radius of the diffractive optical surface in the diffractive optical element.

4. The objective lens according to claim 2, wherein the following conditional expression is satisfied:

$$vd\text{max} \leq 85$$

where v dmax denotes a maximum value of Abbe numbers of positive lenses included in the objective lens.

5. The objective lens according to claim 2, wherein the following conditional expressions are satisfied:

$$nd1 \leq 1.54$$

$$0.0145 \leq nF1\text{-}nC1$$

$$1.55 \leq nd2$$

$$nF2\text{-}nC2 \leq 0.013$$

where nd1 denotes a refractive index at the d-line, nF1 denotes a refractive index at the F-line, and nC1 denotes a refractive index at the C-line of a material of the diffractive element constituent of which refractive index is lower and Abbe number is smaller, out of the two diffractive element constituents of the diffractive optical element, nd2 denotes a refractive index at the d-line, nF2 denotes a refractive index at the F-line, and nC2 denotes a refractive index at the C-line of a material of the diffractive element constituent of which refractive index is higher and Abbe number is greater, out of the two diffractive element constituents of the diffractive optical element.

6. The objective lens according to claim 2, wherein the first lens group has at least one positive single lens.

7. The objective lens according to claim 1, wherein the following conditional expression is satisfied:

$$2 \leq N/H \leq 10$$

where N denotes a number of diffraction grating grooves on the diffractive optical surface in the diffractive optical element, and H denotes an effective radius of the diffractive optical surface in the diffractive optical element.

8. The objective lens according to claim 7, wherein the following conditional expression is satisfied:

$$vd\text{max} \leq 85$$

where v dmax denotes a maximum value of Abbe numbers of positive lenses included in the objective lens.

9. The objective lens according to claim 7, wherein the following conditional expressions are satisfied:

$$nd1 \leq 1.54$$

$$0.0145 \leq nF1\text{-}nC1$$

$$1.55 \leq nd2$$

$$nF2\text{-}nC2 \leq 0.013$$

where nd1 denotes a refractive index at the d-line, nF1 denotes a refractive index at the F-line, and nC1 denotes a refractive index at the C-line of a material of the diffractive element constituent of which refractive index is lower and Abbe number is smaller, out of the two diffractive element constituents of the diffractive optical element, nd2 denotes a refractive index at the d-line, nF2 denotes a refractive index at the F-line, and nC2 denotes a refractive index at the C-line of a material of the diffractive element constituent of which refractive index is higher and Abbe number is greater, out of the two diffractive element constituents of the diffractive optical element.

10. The objective lens according to claim 7, wherein the first lens group has at least one positive single lens.

11. The objective lens according to claim 1, wherein the following conditional expression is satisfied:

$$vd\text{max} \leq 85$$

where v dmax denotes a maximum value of Abbe numbers of positive lenses included in the objective lens.

12. The objective lens according to claim 11, wherein the following conditional expressions are satisfied:

$$nd1 \leq 1.54$$

$$0.0145 \leq nF1\text{-}nC1$$

$$1.55 \leq nd2$$

$$nF2\text{-}nC2 \leq 0.013$$

where nd1 denotes a refractive index at the d-line, nF1 denotes a refractive index at the F-line, and nC1 denotes a refractive index at the C-line of a material of the diffractive element constituent of which refractive index is lower and Abbe number is smaller, out of the two diffractive element constituents of the diffractive optical element, nd2 denotes a refractive index at the d-line, nF2 denotes a refractive index at the F-line, and nC2 denotes a refractive index at the C-line of a material of the diffractive element constituent of which refractive index is higher and Abbe number is greater, out of the two diffractive element constituents of the diffractive optical element.

13. The objective lens according to claim 11, wherein the first lens group has at least one positive single lens.

14. The objective lens according to claim 1, wherein the following conditional expressions are satisfied:

$nd1 \leq 1.54$ $0.0145 \leq nF1 - nC1$ $1.55 \leq nd2$ $nF2 - nC2 \leq 0.013$ where nd1 denotes a refractive index at the d-line, nF1 denotes a refractive index at the F-line, and nC1 denotes a refractive index at the C-line of a material of the diffractive element constituent of which refractive index is lower and Abbe number is smaller, out of the two diffractive element constituents of the diffractive optical element, nd2 denotes a refractive index at the d-line, nF2 denotes a refractive index at the F-line, and nC2 denotes a refractive index at the C-line of a material of the diffractive element constituent of which refractive index is higher and Abbe number is greater, out of the two diffractive element constituents of the diffractive optical element.

15. The objective lens according to claim 14, wherein the first lens group has at least one positive single lens.

16. The objective lens according to claim 1, wherein the first lens group has at least one positive single lens.

* * * * *